US008780858B2

(12) United States Patent
Lee et al.

(10) Patent No.: US 8,780,858 B2
(45) Date of Patent: Jul. 15, 2014

(54) CONTROLLING TRANSMISSION CONTROL PROTOCOL (TCP) TRANSMISSIONS IN HANDOVER

(75) Inventors: Kuo-Chun Lee, San Diego, CA (US); Srinivasan Balasubramanian, San Diego, CA (US); Jun Wang, La Jolla, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 12/975,776

(22) Filed: Dec. 22, 2010

(65) Prior Publication Data

US 2011/0164589 A1 Jul. 7, 2011

Related U.S. Application Data

(60) Provisional application No. 61/292,430, filed on Jan. 5, 2010, provisional application No. 61/292,439, filed on Jan. 5, 2010.

(51) Int. Cl.
*H04W 4/00* (2009.01)
*H04W 36/02* (2009.01)
*H04W 36/00* (2009.01)

(52) U.S. Cl.
CPC .......... *H04W 36/02* (2013.01); *H04W 36/0011* (2013.01)
USPC ....................................................... 370/331

(58) Field of Classification Search
CPC ........................ H04W 36/02; H04W 36/0011
USPC ....................................................... 370/331
See application file for complete search history.

(56) References Cited

U.S. PATENT DOCUMENTS 6,876,639 B1 * 4/2005 Cao ............................... 370/331
2003/0214923 A1 * 11/2003 Omae et al. ................... 370/331

(Continued)

FOREIGN PATENT DOCUMENTS

WO WO2008067354 A2 6/2008

OTHER PUBLICATIONS

Dongwook Lee et al., "Delayed-duplicated ACK (DDA) algorithm for TCP performance enhancement to overcome packet sequence disruption in fast-handoff of mobile ipV6", Distributed Computing Systems Workshops, 2004, Proceedings 24th Inter National Conference on Hachioji, Tokyo, Japan Mar. 23-24, 2004, Piscataway, NJ, USA.IEEE, Mar. 23, 2004, pp. 98-103, XP010695590, DOI:10.1109/ICDCSW.2004.1284015, ISBN: 978-0-7695-2087-2.

(Continued)

*Primary Examiner* — Asad Nawaz
*Assistant Examiner* — Saad A Waqas
(74) *Attorney, Agent, or Firm* — John J. Ketchum

(57) ABSTRACT

Methods and apparatuses are provided that pausing transmission control protocol (TCP) transmissions during or following handover to prevent unwarranted duplicated acknowledgement transmission, which can cause decrease in TCP window size. During handover, transmission on-hold commands can be sent to a TCP layer that indicate to prepare to pause TCP transmissions, immediately pause TCP transmissions, and/or the like. Transmission resume commands can be sent to the TCP layer following handover. In addition, TCP transmissions can be paused following handover to allow data forwarding data to be provisioned to a device from a target base station without duplicated acknowledgement transmission.

31 Claims, 18 Drawing Sheets

(56) References Cited

U.S. PATENT DOCUMENTS

| | | |
|---|---|---|
| 2004/0240413 A1 | 12/2004 | Kim et al. |
| 2006/0092838 A1 | 5/2006 | Lee |
| 2006/0268780 A1 | 11/2006 | Chou et al. |
| 2007/0147305 A1* | 6/2007 | Farley et al. ............... 370/331 |
| 2008/0225795 A1* | 9/2008 | Sun et al. ................. 370/331 |

OTHER PUBLICATIONS

Goff T et al., "Freeze-TCP: A true end-to-end TCP enhancement mechanism for mobile environments", INFOCOM 2000, Nineteenth Annual Joint Conference of the IEEE Computer and Communications Societies, Proceedings IEEE Tel Aviv, Israel Mar. 26-30, 2000, Piscataway, NJ, USA,IEEE, US, vol. 3, Mar. 26, 2000, pp. 1537-1545, XP010376091, DOI: DOI:10.1109/INFCOM.2000.832552 ISBN: 978-0-7803-5880-5.
International Search Report and Written Opinion—PCT/US2011/020275, ISA/EPO—Jul. 15, 2011.
Young-Soo Choi et al., "TCP with Explicit Handoff Notification for a Seamless Vertical Handoff", Jan. 23, 2007, Information Networking, Towards Ubiquitous Networking and Services, Springer Berlin Heidelberg, Berlin, Heidelberg, pp. 831-840, XP019111922, ISBN: 978-3-540-89523-7.
Taiwan Search Report—TW100100223—TIPO—Jul. 28, 2013.

* cited by examiner

CONTROLLING TRANSMISSION CONTROL PROTOCOL (TCP) TRANSMISSIONS IN HANDOVER

CLAIM OF PRIORITY UNDER 35 U.S.C. §119

The present application for patent claims priority to Provisional Application No. 61/292,430 entitled "A METHOD FOR FACILITATING MOBILE TERMINAL FEEDBACK TO OPTIMIZE TRANSMISSION CONTROL PROTOCOL THROUGHPUT IN LONG TERM EVOLUTION INTER-RAT/INTRA-RAT HANDOVER," filed Jan. 5, 2010, and assigned to the assignee hereof and hereby expressly incorporated by reference herein, as well as Provisional Application No. 61/292,439 entitled "IMPROVING TCP THROUGHPUT DURING PACKET FORWARDING IN LTE INTRA-RAT/INTER-RAT HANDOVER," filed Jan. 5, 2010, and assigned to the assignee hereof and hereby expressly incorporated by reference herein.

BACKGROUND

1. Field

The following description relates generally to wireless network communications, and more particularly to controlling transmission control protocol (TCP) transmissions in handover.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, a device can handover communications among various base stations, which can be of different radio access technologies (RAT), to provide a user thereof with a seamless network access experience. The device can also be implemented with transmission control protocol (TCP) congestion control functionality to allow for resizing a TCP window size to control data rate at the device and/or transmitter based on aspects of received packets. For example, if packets are being transmitted quicker than the device can receive and process the packets, this can be determined based at least in part on detecting out-of-sequence packets (e.g., according to a sequence number related to the received packets). The TCP layer of the device can determine the out-of-sequence packets and can indicate congestion to a base station or other transmitter by communicating one or more duplicated acknowledgements (ACK) over a hybrid automatic repeat/request (HARQ) or similar feedback channel, and the transmitter can accordingly reduce the TCP window size (e.g., to half the size, which can be known as Fast Recovery). During device handover, there can be cases where the device temporarily receives out-of-sequence TCP packets; however, reducing the window size at the transmitter may not be the desired behavior.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating pausing transmission control protocol (TCP) layer transmissions based at least in part on performing a handover. For example, commands can be sent to the TCP layer related to pausing transmissions for at least a period of time following receipt of a command to modify radio connectivity (e.g., a handover command in intra-radio access technology (RAT) or optimized handover, a command for releasing resources in inter-RAT handover via redirection, etc.). In addition, the TCP layer can pause transmissions for at least a period of time while receiving data forwarded from the source network to the target network as part of the handover. Thus, TCP layer throughput can be optimized in the case of handover since the TCP layer can pause from transmitting packets or feedback until handover is complete and/or data forwarding is complete, which otherwise could cause unwanted congestion control at the TCP layer.

According to an example, a method of pausing TCP transmission based at least in part on a handover is provided that includes receiving a radio modification command from the network regarding modifying radio connectivity. The method further includes sending at least one transmission on-hold command to a TCP layer related to pausing TCP transmission based at least in part on receiving the radio modification command.

In another aspect, an apparatus for pausing TCP transmission based at least in part on a handover is provided that includes at least one processor configured to obtain a radio modification command from a network regarding modifying radio connectivity. The at least one processor is further configured to send at least one transmission on-hold command to a TCP layer related to pausing TCP transmission based at least in part on the radio modification command. In addition, the apparatus includes a memory coupled to the at least one processor.

In yet another aspect, an apparatus for pausing TCP transmission based at least in part on a handover is provided that includes means for facilitating communicating packets in a network and means for receiving a radio modification command from the network regarding modifying radio connectivity. The apparatus further includes means for sending at least one transmission on-hold command to the means for facilitating communicating related to pausing TCP transmission based at least in part on receiving the radio modification command.

Still, in another aspect, a computer-program product is provided for pausing TCP transmission based at least in part on a handover including a computer-readable medium having code for causing at least one computer to obtain a radio modification command from a network regarding modifying radio connectivity. The computer-readable medium further includes code for causing the at least one computer to send at least one transmission on-hold command to a TCP layer related to pausing TCP transmission based at least in part on the radio modification command.

Moreover, in an aspect, an apparatus for pausing TCP transmission based at least in part on a handover is provided that includes a TCP layer for facilitating communicating packets in a network and a radio modification command receiving component for obtaining a radio modification command from the network regarding modifying radio connectivity. The apparatus further includes a transmission on-hold command provisioning component for sending at least one transmission on-hold command to the TCP layer related to pausing TCP transmission based at least in part on receiving the radio modification command.

According to another example, a method for controlling TCP feedback transmission following a handover is provided that includes determining completion of a handover procedure and pausing TCP feedback transmission based at least in part on the determining completion of the handover procedure. The method further includes determining completion of data forwarding by a target base station following the handover procedure and resuming TCP feedback transmission based at least in part on the determining completion of data forwarding.

In another aspect, an apparatus for controlling TCP feedback transmission following a handover is provided that includes at least one processor configured to determine completion of a handover procedure and pause TCP feedback transmission based at least in part on determining completion of the handover procedure. The at least one processor is further configured to determine completion of data forwarding by a target base station following the handover procedure and resume TCP feedback transmission based at least in part on the determining completion of data forwarding. In addition, the apparatus includes a memory coupled to the at least one processor.

In yet another aspect, an apparatus for controlling TCP feedback transmission following a handover is provided that includes means for determining completion of a handover procedure and means for pausing TCP feedback transmission based at least in part on the means for determining completion of the handover procedure determining completion of the handover procedure. The apparatus further includes means for determining completion of data forwarding by a target base station following the handover procedure, wherein the means for pausing TCP feedback transmission resumes TCP feedback transmission based at least in part on the means for determining completion of data forwarding determining completion of data forwarding.

Still, in another aspect, a computer-program product is provided for controlling TCP feedback transmission following a handover including a computer-readable medium having code for causing at least one computer to determine completion of a handover procedure and code for causing the at least one computer to pause TCP feedback transmission upon determining completion of the handover procedure. The computer-readable medium further includes code for causing the at least one computer to determine completion of data forwarding by a target base station following the handover procedure and code for causing the at least one computer to resume TCP feedback transmission upon the determining completion of data forwarding.

Moreover, in an aspect, an apparatus for controlling TCP feedback transmission following a handover is provided that includes a handover component for determining completion of a handover procedure and a TCP layer for pausing TCP feedback transmission upon the handover component determining completion of the handover procedure. The apparatus further includes a component for determining completion of data forwarding by a target base station following the handover procedure, wherein the TCP layer resumes TCP feedback transmission upon the component determining completion of data forwarding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
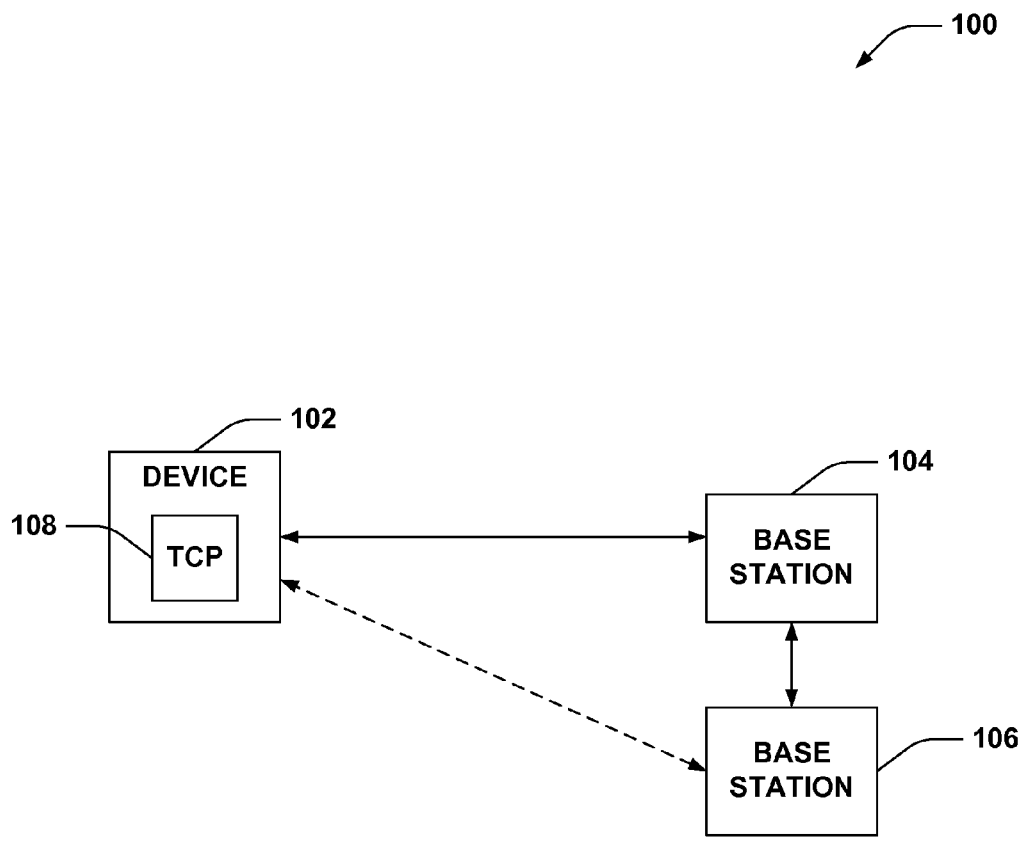
FIG. 1 illustrates an example system for controlling transmission control protocol (TCP) transmissions based at least in part on a handover.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, transmission control protocol (TCP) layer transmissions can be paused at a device as part of handing over device communications. In one example, upon receiving a command to modify radio connectivity as part of handover, the device can command the TCP layer to prepare to pause TCP transmissions, to immediately pause TCP transmissions, and/or the like. Similarly, upon determining handover is complete, the device can notify the TCP layer to resume transmissions. Thus, the TCP layer need not handle retransmission timeout that can otherwise result when attempting to retransmit packets during handover. Similarly, the TCP layer is temporarily prevented from communicating duplicated acknowledgements (ACK) feedback for packets received out-of-sequence, which can result in decreasing the TCP window size. In addition, the TCP layer can pause transmissions during data forwarding from a target network following handover as well.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates performing handover of device communications. System 100 includes a device 102 that communicates with a base station 104 (e.g., to receive access to a wireless network). System 100 also includes a base station 106 to which device 102 can be handed over. Device 102 can be a UE, modem (or other tethered device), a portion thereof, and/or the like, and can include a TCP layer

108. Base stations 104 and 106 can each be a macrocell, femtocell, picocell, or similar base station, a relay node, a mobile base station, a device communicating in peer-to-peer or ad-hoc mode, a portion thereof and/or the like. In addition, base stations 104 and 106 can be of a similar or different radio access technology (RAT).

According to an example, device 102 can communicate with base station 104, and can be handed over to base station 106. In one example, device 102 can measure signal-to-noise ratio (SNR) or other communication metrics of neighboring cells or related base stations, and can provide measurement reports to base station 104. Base station 104 can determine to handover device 102 communications to base station 106 based at least in part on the measurement reports (e.g., base station 104 can determine a SNR of base station 106 is over a threshold level better than SNR of base station 104 at device 102). In this regard, base station 104 can communicate device 102 information with base station 106 and can command device 102 to handover to base station 106, as described further in other examples herein. Device 102 can, thus, begin communicating with base station 106. In one example, base station 104 can have forwarded data to base station 106 for device 102 (e.g., data that base station 104 did not have a chance to transmit to device 102 before handover). This can be referred to herein as data forwarding. Following handover, base station 106 can transmit the data to device 102 following handover to mitigate data loss.

TCP layer 108 can also utilize TCP congestion control to limit TCP window sizes utilized by base stations 104, 106, or other transmitters to communicate with device 102. In an example, congestion control can be triggered at the transmitter by receiving a number of duplicated ACKs over a feedback channel, a retransmission timer timeout, and/or the like. While handover is being performed for device 102, if TCP layer 108 is attempting to retransmit and/or is generating feedback for received packets, undesirable results can occur due to congestion control. For example, while handover is being performed for device 102, the TCP layer 108 may not be able to effectively retransmit packets indicated for retransmission until after handover. Thus, TCP layer 108 may experience retransmission timer timeout, which can cause congestion control to decrease a TCP window size. Similarly, the TCP layer 108 may receive out-of-sequence packets during handover and/or data forwarding following handover, which can similarly lead to TCP window size decreasing based on transmitting multiple duplicated ACKs to base station 104 and/or 106. In this regard, the TCP layer 108 can pause transmission during one or more periods of time related to handover.

In one example, device 102 can receive a radio modification command to modify radio connectivity from base station 104 as part of handover. For example, this can include a handover command (e.g., in optimized inter-RAT handover), a connection release or reconfiguration (e.g., in inter-RAT or intra-RAT handover), and/or the like. Based at least in part on receiving the radio modification command, device 102 can send a transmission on-hold command to the TCP layer 108 to prepare to pause TCP transmissions, to immediately pause TCP transmissions, and/or the like, and TCP layer 108 can operate according to the command. Similarly, once device 102 determines handover is complete, device 102 can send a transmission resume command to TCP layer 108, and TCP layer 108 can accordingly resume transmissions.

In another example, device 102 can notify TCP layer 108 once the handover procedure has completed (e.g., via transmission resume command or otherwise), and TCP layer 108 can pause at least feedback transmissions based at least in part on one or more events to allow device 102 to receive data forwarding data from base station 106. For example, upon receiving the indication that handover has completed, TCP layer 108 can initialize a timer to allow receipt of data forwarding data during the timer without transmitting related feedback. Upon expiration of the timer, TCP layer 108 can resume feedback transmissions. In another example, upon receiving the indication that handover has completed, TCP layer 108 can determine when packets below a sequence number are no longer received from base station 106 after a period of idle time from the last packet below the sequence number, and can resume feedback transmissions at that time. Moreover, in an example, following receiving the indication that handover has completed, TCP layer 108 can determine when a packet with a reserved bit set is received from base station 106, and can resume feedback transmission upon receiving the packet. In these examples, congestion control and retransmission timers can be suspended for a period of time to improve TCP throughput during and following device 102 handover.

Figure 2:
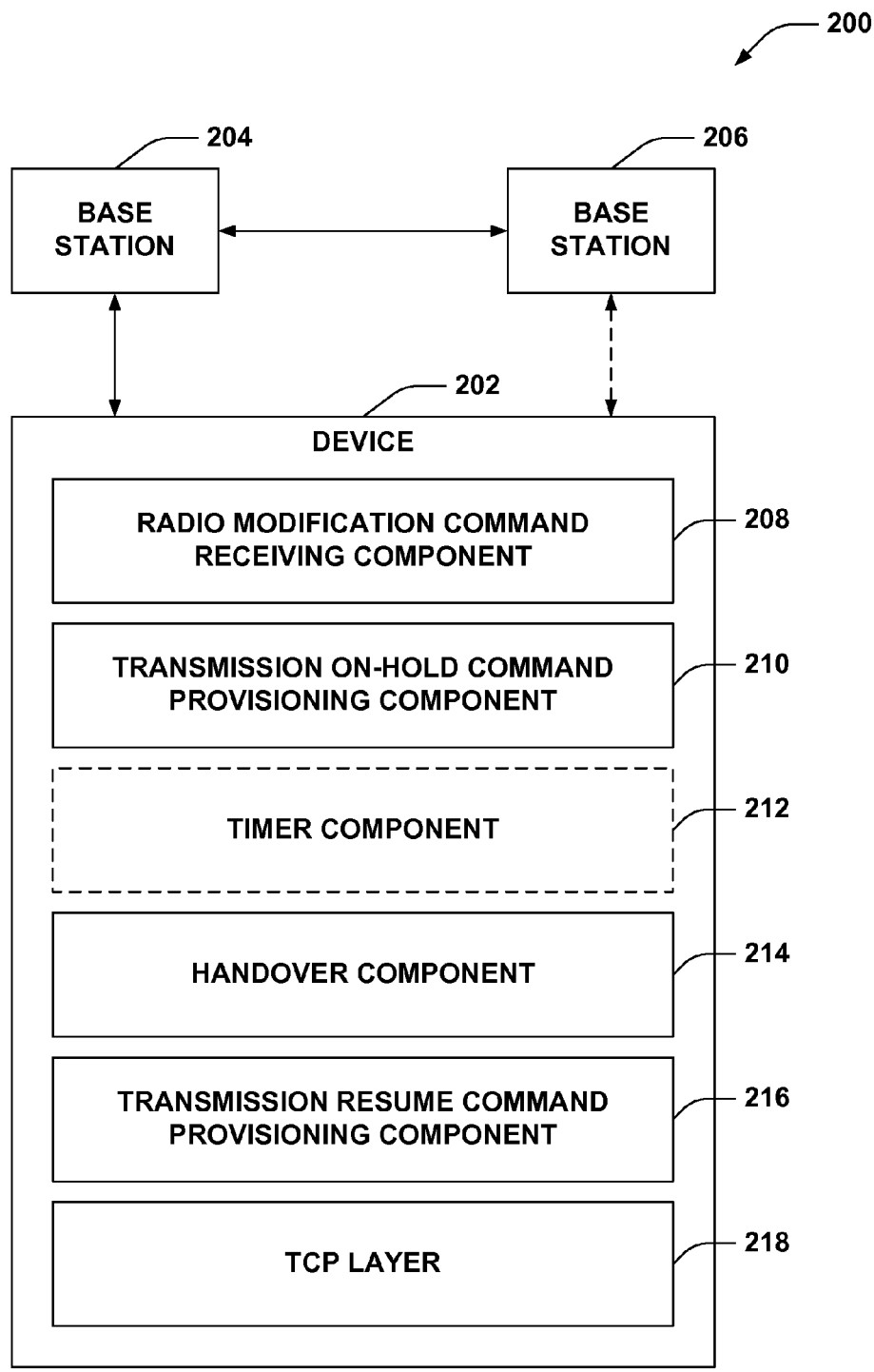
FIG. 2 illustrates an example system for pausing TCP transmissions during handover.

Turning to FIG. 2, an example wireless communication system 200 is illustrated that facilitates improving device TCP throughput during handover. System 200 includes a device 202 that can communicate with base station 204 to receive wireless network access. In addition, device 202 can be handed over to base station 206, in an example. Device 202 can be a UE, modem, a portion thereof, etc., and base stations 204 and 206 can each be a macrocell, femtocell, picocell, or similar base station, a relay node, mobile base station, device in peer-to-peer or ad-hoc mode, a portion thereof, etc., as described.

Device 202 can comprise a radio modification command receiving component 208 that obtains a radio modification command from a base station related to handing over to another base station, a transmission on-hold command provisioning component 210 that instructs a TCP layer to prepare to pause or immediately pause TCP transmissions via one or more transmission on-hold commands, and an optional timer component 212 that initializes a timer for sending a command to hold transmissions to the TCP layer after sending a command to prepare to hold transmissions. Device 202 also comprises a handover component 214 that completes handover from the base station to the other base station, a transmission resume command provisioning component 216 that instructs the TCP layer to resume transmissions, and a TCP layer 218 over which packets can be received and transmitted to one or more base stations or other devices.

According to an example, device 202 communications can be handed over from base station 204 to base station 206, as described. As part of the handover, radio modification command receiving component 208 can obtain a command to modify radio connectivity. For example, the radio modification command can relate to a handover command in optimized inter-RAT handover, a connection release or reconfiguration in inter-RAT via redirection or intra-RAT handover, and/or the like. Based at least in part on the radio modification command, transmission on-hold command provisioning component 210 can send a transmission on-hold command to TCP layer 218 to instruct TCP layer 218 to prepare to pause transmissions or immediately pause transmissions. For example, in intra-RAT and/or optimized inter-RAT handover, transmission on-hold command provisioning component 210 can instruct the TCP layer 218 to prepare to pause transmissions via transmission on-hold command. In this example, TCP layer 218 can perform one or more transmissions before receiving a subsequent transmission on-hold command from transmission on-hold command provisioning component 210 to immediately pause TCP transmissions. For example, TCP layer 218 can transmit an end-to-end message (e.g., end-to-end feedback) upon receiving an instruction to prepare to pause transmissions.

In addition, where transmission on-hold command provisioning component 210 instructs TCP layer 218 to prepare to pause TCP transmissions, timer component 212 can initialize a timer, upon expiration of which transmission on-hold command provisioning component 210 can instruct TCP layer 218 to immediately pause TCP transmissions. In another example, transmission on-hold command provisioning component 210 can instruct TCP layer 218 to immediately pause TCP transmissions after TCP layer 218 transmits the end-to-end message via a transmission on-hold command.

In this example, handover component 214 can communicate with base station 204 and/or base station 206 to complete the handover (e.g., over TCP layer 218). Handover component 214 can determine handover is complete based at least in part on transmitting a handover or reconfiguration complete message to base station 206 in optimized inter-RAT or intra-RAT handover, determining a radio bearer is setup or receiving a vendor specific network control protocol (VSNCP) message in inter-RAT handover via redirection, and/or the like. Once determined, transmission resume command provisioning component 216 can transmit a transmission resume command to TCP layer 218 to instruct TCP layer 218 to resume TCP transmissions, and TCP layer 218 can accordingly resume TCP transmissions. In this regard, as described, TCP transmissions are paused during at least part of a handover to prevent the TCP layer 218 from experiencing failed retransmissions, receiving out-of-sequence packets, and/or the like, which can cause TCP layer 218 to otherwise transmit duplicated ACKs, which cause decrease in TCP window size impacting TCP throughput.

In addition, in one example, the TCP layer 218 can utilize a TCP retransmission timer for determining whether an ACK is received corresponding to a transmitted packet; where the ACK is not received during the duration of the timer, for example, the packet can be retransmitted. Where a transmission on-hold command is received, however, TCP layer 218 pauses the TCP retransmission timer, for example, since the TCP layer 218 does not transmit packets following the transmission on-hold command. Subsequently, in this example, upon receiving the transmission resume command, TCP layer 218 resumes the TCP retransmission timer.

Figure 3:
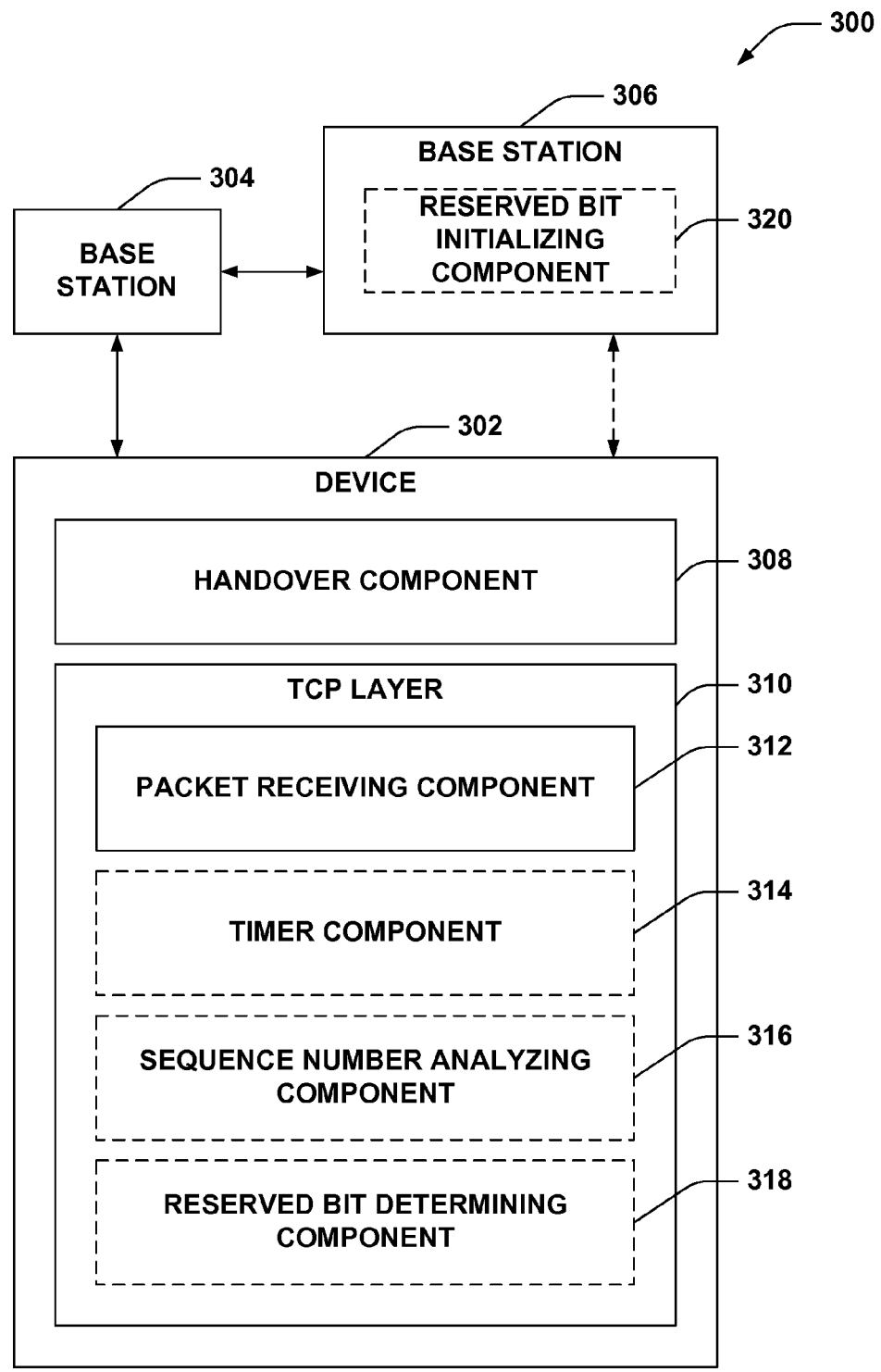
FIG. 3 illustrates an example system for pausing TCP transmissions following handover to allow for provisioning data forwarding data from a target base station.

Referring to FIG. 3, illustrated is an example wireless communication system 300 that facilitates pausing TCP feedback transmission while receiving data forwarding data in handover. System 300 includes a device 302 that communicates with base station 304 (e.g., to access a wireless network). System 300 additionally comprises a base station 306 to which device 302 can be handed over. As described, device 302 can be a UE, modem, a portion thereof, etc., and base stations 304 and 306 can each be a macrocell, femtocell, picocell, or similar base station, a relay node, mobile base station, device in peer-to-peer or ad-hoc mode, a portion thereof, etc.

Device 302 can comprise a handover component 308 that performs handover from one base station to another, and a TCP layer 310 that transmits packets to and receives packets from one or more base stations or other devices. TCP layer 310 can comprise a packet receiving component 312 that obtains data packets forwarded from the one base station to the other for the device 302, and an optional timer component 314 that initializes a timer for determining when to resume TCP feedback transmissions. TCP layer 310 can also comprise an optional sequence number analyzing component 316 that determines when to resume TCP feedback transmissions based at least in part on a sequence number of one or more of the forwarded packets, and an optional reserved bit determining component 318 that analyzes a reserved bit in one or more packets. In addition, in one example, base station 306 can optionally comprise a reserved bit initializing component 320 that can set a reserved bit in one or more packets to indicate a last data forwarding packet or a from a different base station or a first non-data forwarding packet.

According to an example, device 302 communications can be handed over from base station 304 to base station 306, as described above. Handover component 308 can facilitate communicating with base stations 304 and 306 to perform handover (e.g., transmit measurement reports, receive handover commands, receive connection release or modification messages, and/or the like), which can be performed through TCP layer 310. In addition, handover component 308 can determine completion of handover, as described previously (e.g., based at least in part on transmitting a handover or reconfiguration complete message to base station 206 in optimized inter-RAT or intra-RAT handover, determining a radio bearer is setup or receiving a vendor specific network control protocol (VSNCP) message in inter-RAT handover, and/or the like). Following handover, packet receiving component 312 can obtain data forwarding data packets that were forwarded from base station 304 to base station 306 as part of the handover. As described, the data can be transmitted by base station 306 to device 302 following handover, and the packets can arrive at packet receiving component 312 out-of-sequence with each other and/or with other packets arriving at device 302. This can ordinarily cause a congestion control function at TCP layer 310 to decrease a transmission window size, as described; however, handover component 308 can notify TCP layer 310 when handover has completed, and TCP layer 310 can pause TCP feedback transmission to resume after occurrence of one or more events to prevent undesired congestion control. For example, TCP layer 310 can comprise one or more of timer component 314, sequence number analyzing component 316, or reserved bit determining component 318 that can each discern completion of data forwarding.

In one example, timer component 314 can initialize a timer based at least in part on TCP layer 310 pausing TCP feedback transmissions, and TCP layer 310 can resume TCP feedback transmissions once the timer expires. For example, upon TCP layer 310 receiving a notification from handover component 308 that handover is complete, timer component 314 can initialize the timer. Thus, during the timer, packet receiving component 312 can receive forwarded data regardless of order, and TCP layer 310 does not transmit duplicate ACKs for out-of-sequence packets. Once the timer expires, timer component 314 can inform TCP layer 310 that data forwarding is complete, and thus TCP layer 310 can resume TCP feedback transmissions. In one example, timer component 314 can set the timer to different values based at least in part on a handover type (e.g., optimized inter-RAT, inter-RAT via redirection, intra-RAT, etc.).

In another example, based on TCP layer 310 receiving notification that handover has completed, sequence number analyzing component 316 can set a threshold sequence number difference T above the lower end of the receive window, which can be denoted rx_min_wnd, upon TCP layer 310 determining completion of a handover (e.g., via notification from handover component 308). Sequence number analyzing component 316 can determine sequence numbers associated with packets received at packet receiving component 312, and when no packets are received with a sequence number S within a range of sequence numbers <T+rx_min_wnd for a period of time, sequence number analyzing component 316 can determine data forwarding is complete and can so notify TCP layer 310. Thus, TCP layer 310 can resume transmitting TCP feedback. In one example, the period of time can be specified by timer component 314, and in one example, the timer component 314 can reset the timer each time a received packet with sequence number S<T+rx_min_wnd is determined by sequence number analyzing component 316. In this example, when the timer expires, sequence number analyzing component 316 can determine completion of data forwarding.

In yet another example, reserved bit determining component 318 can analyze a reserved bit of packets received from base station 306 after TCP layer 310 receives the indication that handover has completed (e.g., from handover component 308). Reserved bit initializing component 320 can set a reserved bit (e.g., to 1) in the last data forwarding packet or the first packet that is not a data forwarding packet. For example, reserved bit initializing component 320 can set the reserved bit in the header of the packet. Packet receiving component 312 can receive this packet, and reserved bit determining component 318 can detect the set reserved bit. In this regard, reserved bit determining component 318 can determine completion of data forwarding and can so notify TCP layer 310. Thus, TCP layer 310 can resume TCP feedback transmissions based at least in part on receiving the packet with the reserved bit set.

It is to be appreciated that components shown in device 302 can be present in device 202 of FIG. 2, and/or vice versa, to provide similar functionality during and after handover. In addition, though components 312 314, 316, and 318 are shown within TCP layer 310, it is to be appreciated that these components can perform outside of the TCP layer, and can communicate with TCP layer 310 to provide the desired functionality. Moreover, in one example, TCP layer 310 can pause and resume transmission of duplicated ACK specifically, and not necessarily all TCP feedback.

Figure 4:
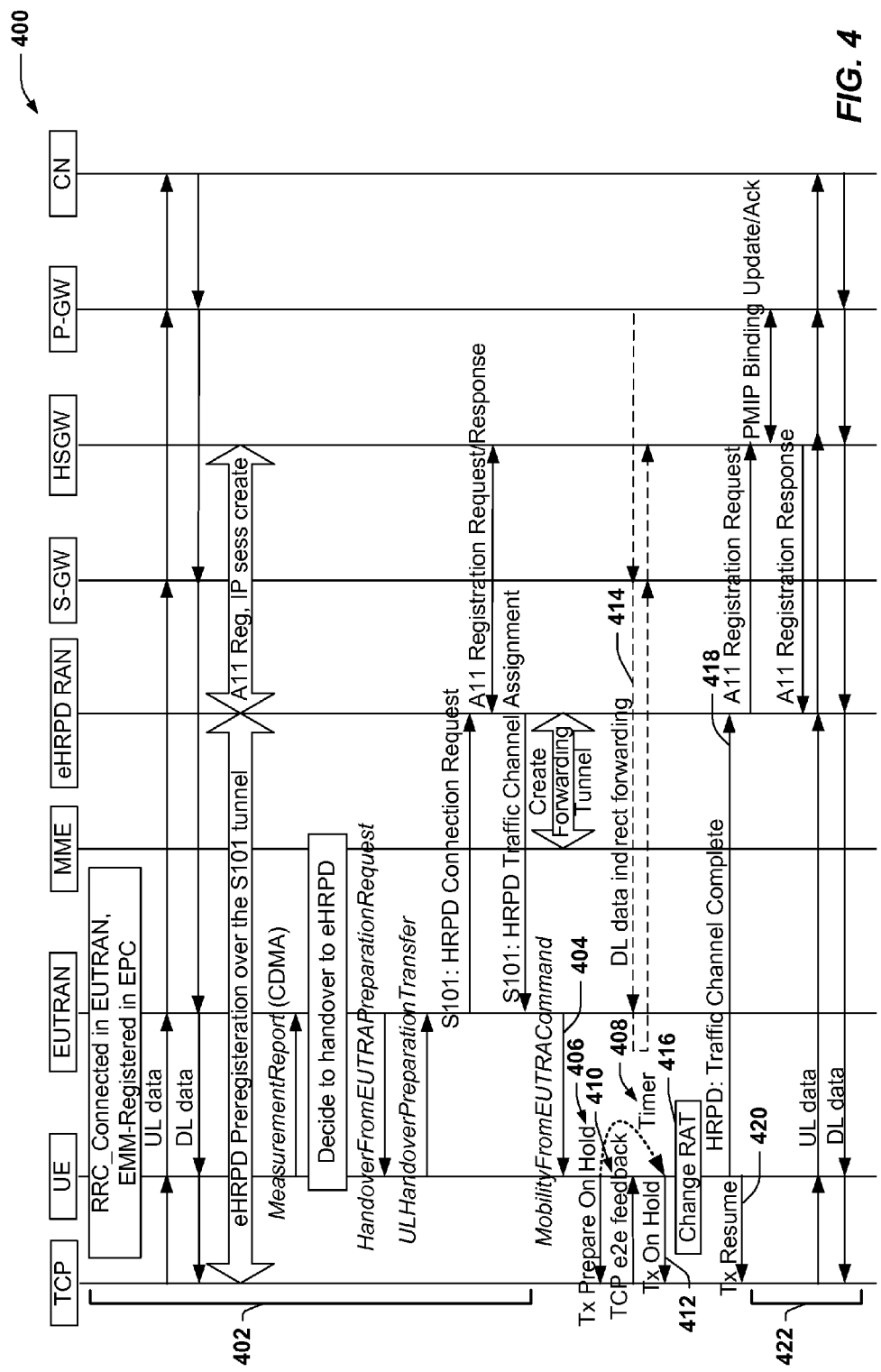
FIG. 4 illustrates an example system for pausing TCP transmissions in handover between long term evolution (LTE) and evolved high rate packet data (eHRPD) networks.

Turning to FIGS. 4-8, illustrated are example communication flows for various handover scenarios that illustrate communicating additional commands to pause TCP transmissions during at least a portion of handover. In FIG. 4, for example, an example wireless communication system 400 is illustrated that facilitates handing over communications from LTE to evolved high rate packet data (eHRPD) in optimized mode (e.g., such that a UE can preregister with the eHRPD over an S101 tunnel and include eHRPD systems in measurement reports). FIG. 4 shows an example of a communication flow for the handover among a TCP layer, corresponding UE, evolved UTRA network (EUTRAN), mobility management entity (MME), eHRPD radio access network (RAN), serving gateway (S-GW), home serving gateway (HSGW), packet data network (PDN) gateway (P-GW), and correspondent node (CN). The communication flow through system 400 can include some standard handover messages for handing over from LTE to eHRPD, such as messages and states 402, which include radio resource control (RRC) Connected state in EUTRAN/evolved packet system (EPS), mobility management (EMM)-Registered state in EPC, UL and DL data, eHRPD preregistration over an S101 tunnel, A11 registration and IP session creation, a Measurement Report (CDMA), decision to handover to eHRPD based on the Measurement Report (CDMA), a HandoverFromETURAPreparationRequest, ULHandoverPreparationTransfer, S101: HRPD Connection Request, A11 Registration Request/Response, S101: HRPD Traffic Channel Assignment, and a create forwarding tunnel.

Once MobilityFromEUTRACommand 404 is received at a UE from the EUTRA network, the UE can send a Tx Prepare On Hold 406 command to a TCP layer, as described. In this regard, the TCP layer can prepare to pause TCP transmissions, and can initialize a timer 408 for determining when to pause transmissions. In addition, the TCP layer can accordingly transmit TCP end-to-end (e2e) feedback 410. Upon expiration of the timer 408 (e.g., or upon receiving the e2e feedback 410), UE can send a Tx On Hold 412 command to the TCP layer to pause TCP transmissions. In addition, data can be forwarded 414, as described above. Subsequently, the UE can change the RAT to eHRPD 416. In addition, as part of completing handover, the UE can transmit an HRPD: Traffic Channel Complete 418 to the eHRPD radio access network. In addition, the UE can send a Tx Resume 420 command to the TCP layer to resume TCP transmissions, as described. Following handover, additional standard handover messages 422 can be communicated, including A11 Registration Request, proxy mobile IP (PMIP) Binding Update/Acknowledgement, A11 Registration Response, and UL/DL data can be communicated.

Figure 5:
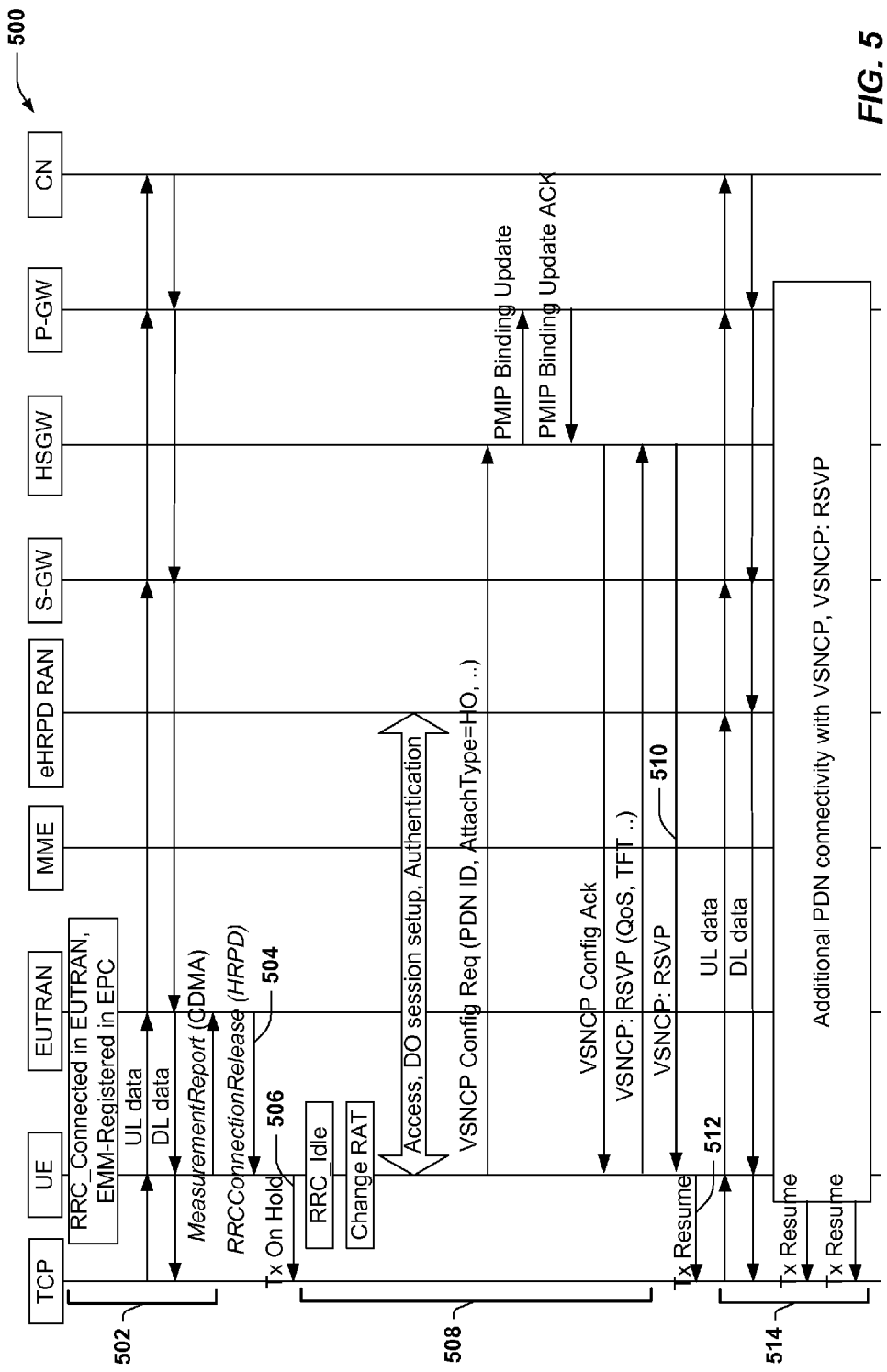
FIG. 5 illustrates an example system for pausing TCP transmissions in handover between LTE and eHRPD networks via redirection.

Referring to FIG. 5, an example wireless communication system 500 is depicted that facilitates pausing TCP transmissions during a LTE to eHRPD handover via redirection. FIG. 5 illustrates an example communication flow for the handover between a TCP layer, corresponding UE, EUTRAN, MME, eHRPD RAN, S-GW, HSGW, P-GW, and CN. In this example, system 500 does not perform an optimized handover (e.g., due to system limitations). Thus, some standard handover messages can be communicated, such as RRC_Connected in EUTRAN/EMM-Registered state in EPC, UL/DL data, and MeasurementReport(CDMA). Subsequently, the UE can receive an RRCConnectionRelease (HRPD) 504 from the EUTRA network as part of handover. Based at least in part on receiving this message, the UE can send a Tx On Hold 506 command to the TCP layer to cause the TCP layer to pause TCP transmissions. Additional handover messages can be communicated among the nodes or states can occur in the LTE to eHRPD handover 508, such as RRC_Idle, a Change in RAT, Access, DO session setup, Authentication, VSNCP Config Request, PMIP Binding Update/Acknowledgement, VSNCP Config Acknowledgement, and VSNCP: RSVP. Another VSNCP: RSVP 510 is received at the UE, which can indicate handover is complete, and thus the UE can send a Tx Resume 512 command to the TCP layer to cause the TCP layer to resume TCP transmissions, as described. In addition, other messages 514 can be communicated including UL/DL data, other Tx Resumes, each per PDN connectivity.

Figure 6:
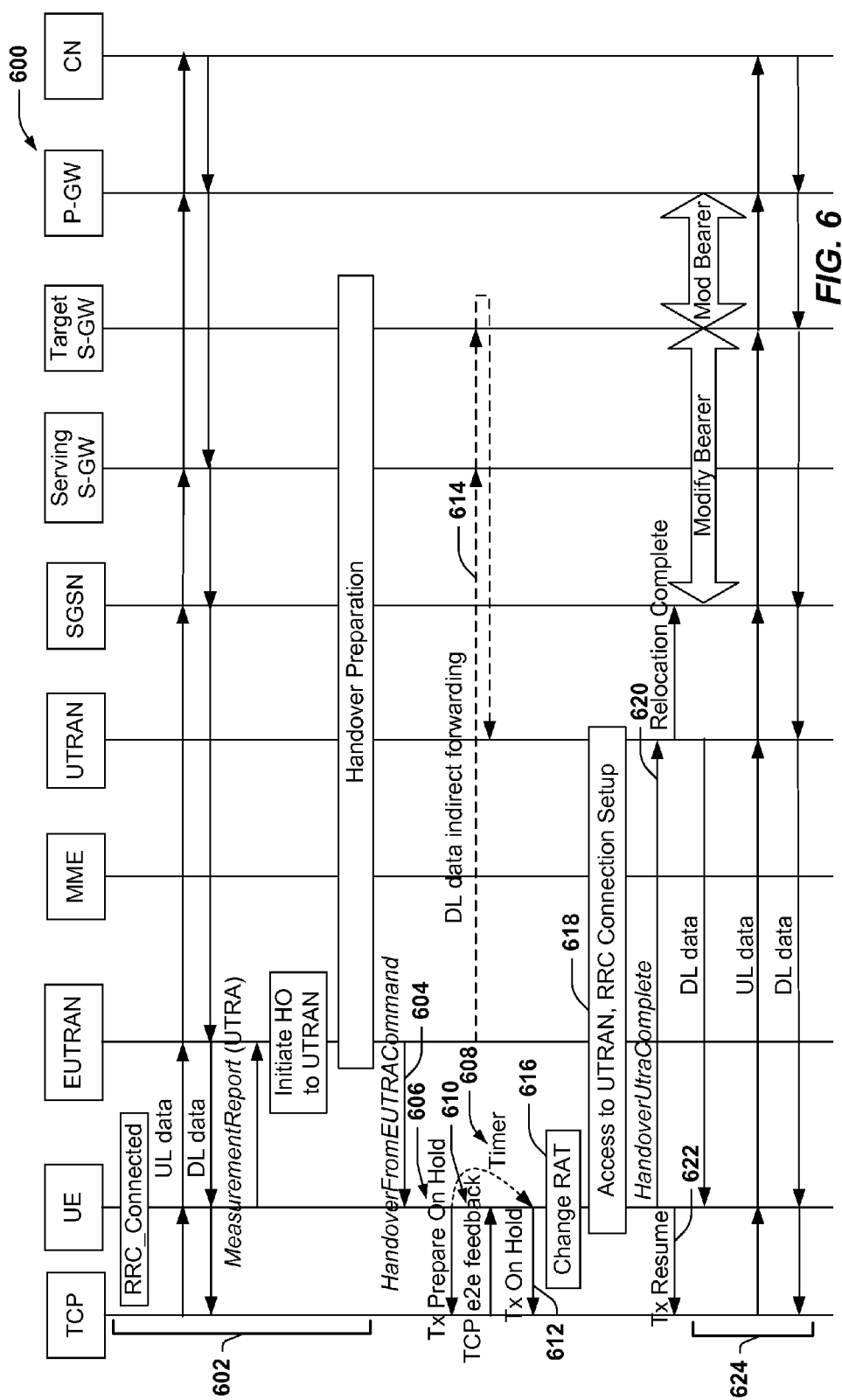
FIG. 6 illustrates an example system for pausing TCP transmissions in handover between LTE and universal mobile telecommunication system (UMTS) networks.

In reference to FIG. 6 an example wireless communication system 600 is illustrated that facilitates handing over communications from LTE to UMTS in optimized mode. FIG. 6 shows an example of a communication flow for the handover between a TCP layer, corresponding UE, EUTRAN, MME, UTRAN, serving general packet radio service (GPRS) support node (SGSN), serving S-GW, target S-GW, P-GW, and CN. In an example, standard handover messages can be communicated or states can occur 602 in the communication flow, such as RRC_Connected state, UL/DL data, MeasurementReport(UTRA), Initiate handover to UTRAN, and handover preparation. Once HandoverFromEUTRACommand 604 is received at a UE from the EUTRA network as part of handover, the UE can send a Tx Prepare On Hold 606 command to a TCP layer, as described. In this regard, the TCP layer can prepare to pause TCP transmissions, and can initialize a timer 608 for determining when to pause transmissions. In addition, the TCP layer can accordingly transmit TCP end-to-end (e2e) feedback 610. Upon expiration of the timer 608 (e.g., or upon receiving the e2e feedback 610), UE can send a Tx On Hold 612 command to the TCP layer to pause TCP transmissions. In addition, DL data can be forwarded 614, as described. The UE can change the RAT 616 to UTRAN, and can access UTRAN, and perform RRC Connection Setup 618. As part of completing handover, the UE can transmit a HandoverUTRAComplete 620 to the eHRPD radio access network. In addition, the UE can send a Tx Resume 622 command to the TCP layer to resume TCP transmissions, as described. Also, standard handover messages 622 can be communicated, such as Relocation Complete (e.g., in response to HandoverUTRAComplete 620), Modify Bearer messages, and UL/DL data communications.

Figure 7:
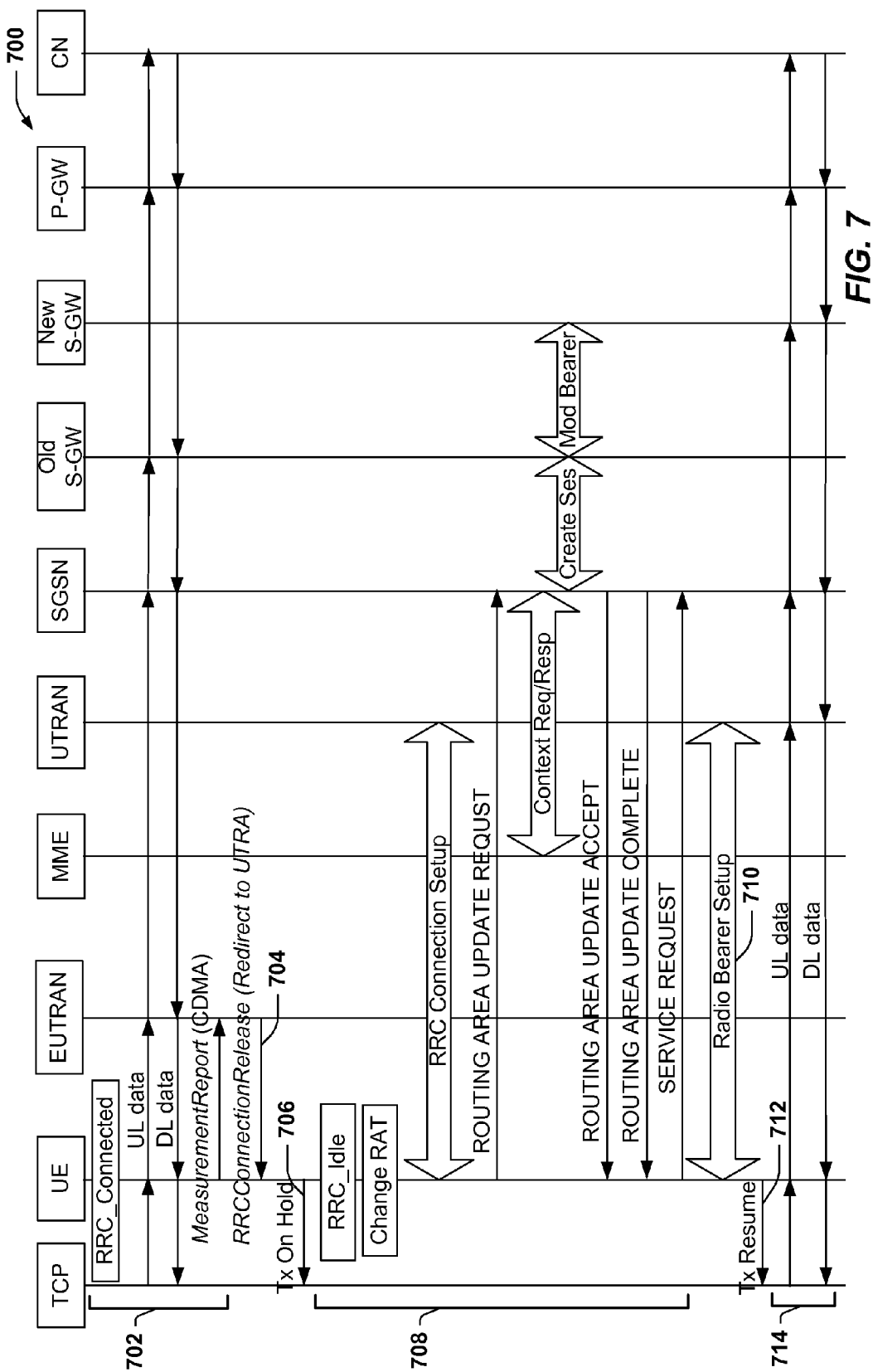
FIG. 7 illustrates an example system for pausing TCP transmissions in handover between LTE and UMTS networks via redirection.

Referring to FIG. 7, an example wireless communication system 700 is depicted that facilitates pausing TCP transmissions during a LTE to UMTS handover via redirection. FIG. 7 illustrates an example communication flow for the handover between a TCP layer, corresponding UE, EUTRAN, MME, UTRAN, SGSN, old S-GW, new S-GW, P-GW, and CN. In this example, system 700 cannot perform an optimized handover (e.g., due to system limitations). Thus, standard handover messages can be communicated or states can occur 702 including UE starting in an RRC_Connected state, transmitting UL/DL data, and MeasurementReport(CDMA). Subsequently, the UE can receive an RRCConnectionRelease (Redirect to UTRA) 704 from the EUTRA network as part of handover. Based at least in part on receiving this message, the UE can send a Tx On Hold 706 command to the TCP layer to cause the TCP layer to pause TCP transmissions. Additional handover messages can be communicated among the nodes or states can occur 708 in the LTE to UMTS handover, such as RRC_Idle at UE, change RAT to UTRAN, RRC Connection Setup, Routing Area Update Request, Context Request/Response, Create Session, Modify Bearer, Routing Area Update Accept, Routing Area Update Complete, and Service Request. Once a Radio Bearer Setup 710 completes, which can indicate completion of handover, the UE can send a Tx Resume 712 command to the TCP layer to cause the TCP layer to resume TCP transmissions, as described. Subsequently, UL/DL data 714 can be communicated.

Figure 8:
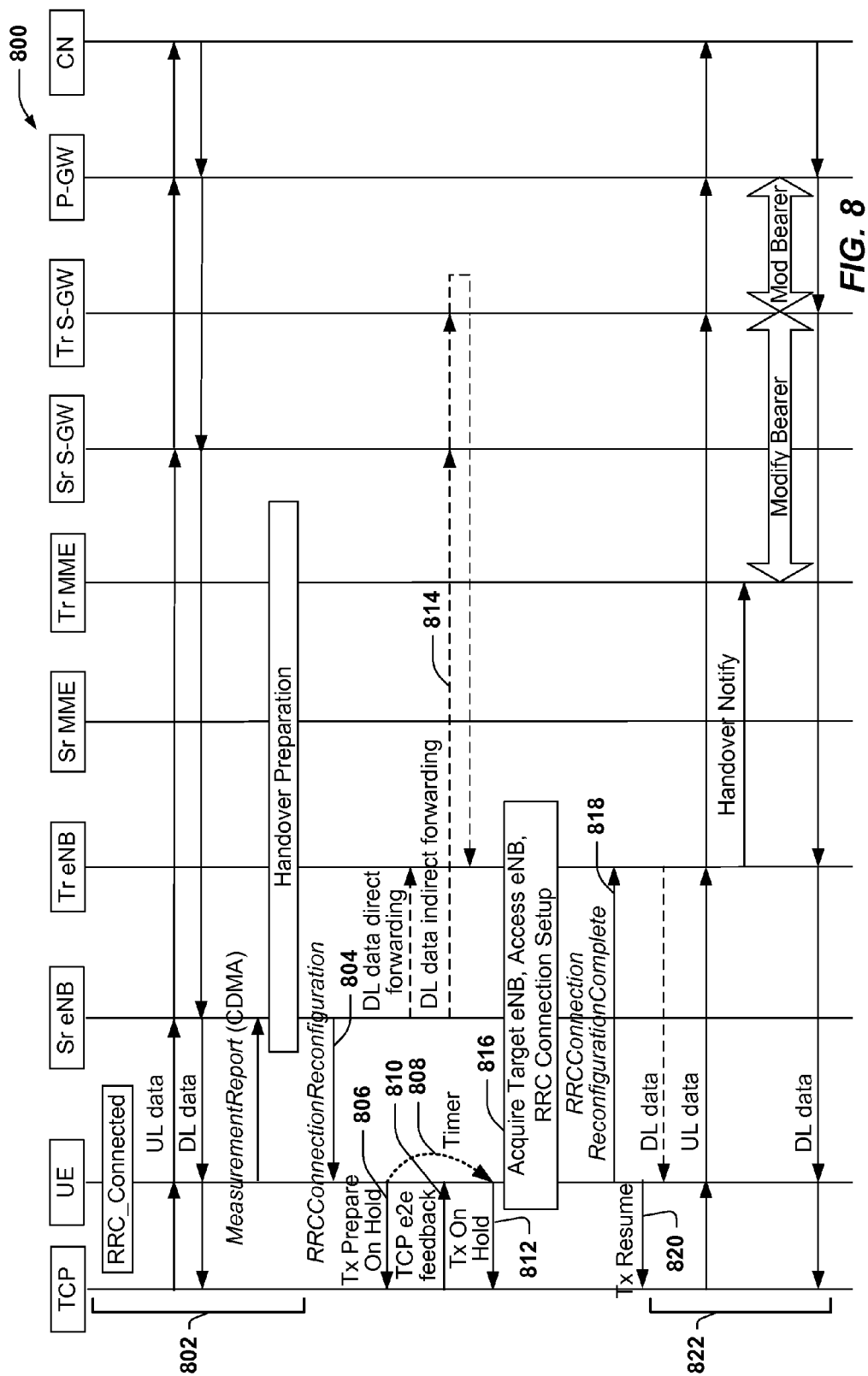
FIG. 8 illustrates an example system for pausing TCP transmissions in intra-LTE handover.

In reference to FIG. 8 an example wireless communication system 800 is illustrated that facilitates handing over communications intra-LTE. FIG. 8 shows an example of a communication flow for the handover between a TCP layer, corresponding UE, source (Sr) eNB, target (Tr) eNB, Sr MME, Tr MME, Sr S-GW, Tr S-GW, P-GW, and CN. Standard handover messages for intra-LTE handover can be communicated or states can occur 802, including the UE in RRC_Connected state, UL/DL data, MeasurementReport(CDMA), and Handover Preparation. In addition, once RRCConnectionReconfiguration 804 is received at a UE from a source eNB as part of handover, the UE can send a Tx Prepare On Hold 806 command to a TCP layer, as described. In this regard, the TCP layer can prepare to pause TCP transmissions, and can initialize a timer 808 for determining when to pause transmissions. In addition, the TCP layer can accordingly transmit TCP end-to-end (e2e) feedback 810. Upon expiration of the timer 808 (e.g., or upon receiving the e2e feedback 810), UE can send a Tx On Hold 812 command to the TCP layer to pause TCP transmissions. In addition, DL data can be forwarded 814, as described, and the UE can acquire target eNB, access eNB, and perform RRC Connection Setup 816. As part of completing handover, the UE can transmit a RRCConnectionReconfigurationComplete 818 to the target eNB. In addition, the UE can send a Tx Resume 820 command to the TCP layer to resume TCP transmissions, as described. In addition, other standard intra-LTE handover messages 820 can be communicated, including UL/DL data transmissions, Handover Notify, and Modify Bearer.

Figure 9:
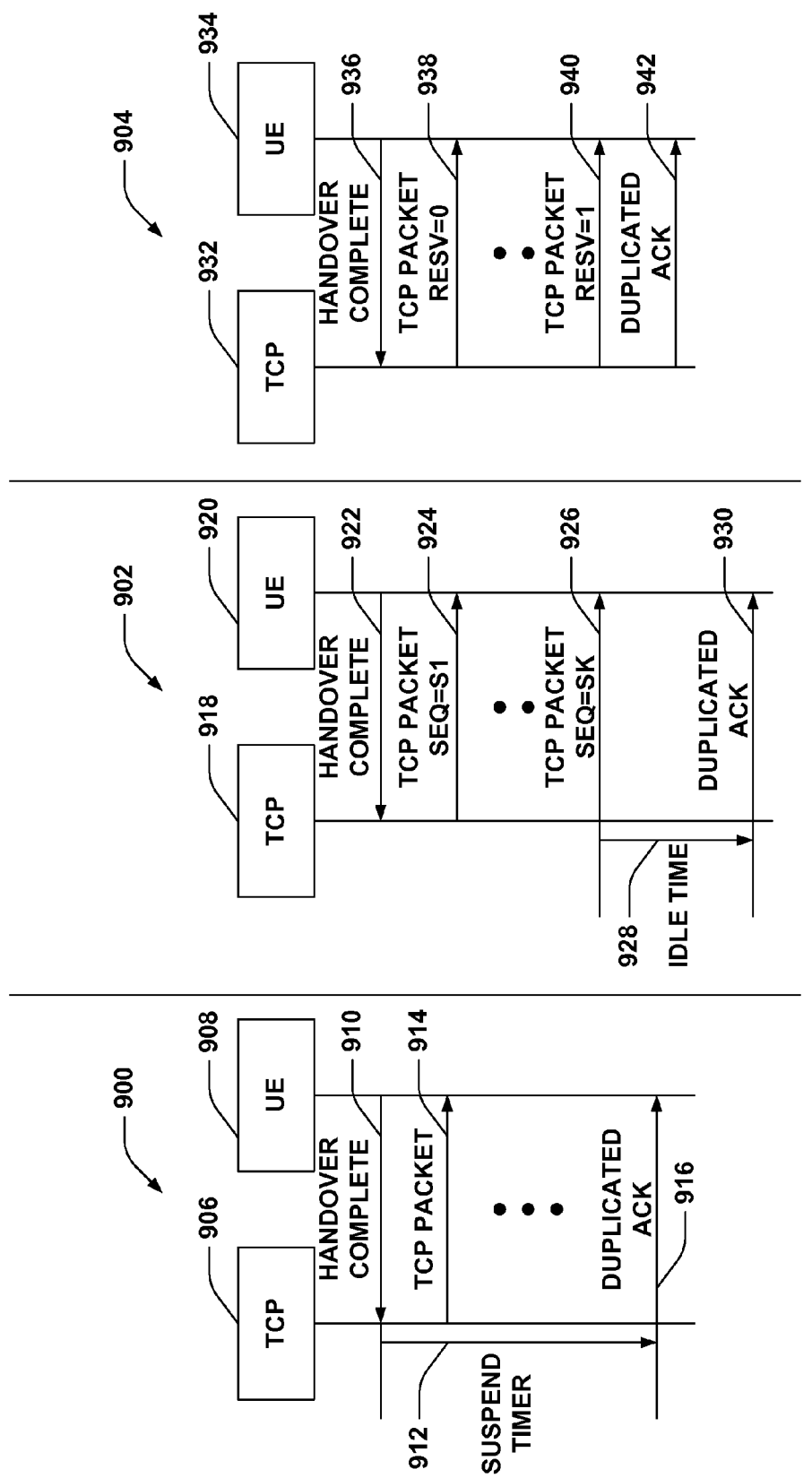
FIG. 9 illustrates example systems for pausing TCP transmissions following handover.

Turning to FIG. 9, example systems 900, 902, and 904 are illustrated that facilitate pausing TCP feedback transmissions for data forwarding. For example, system 900 comprises a TCP layer 906 and a UE 908. The TCP layer 906 can be part of the UE 908, for example, and can communicate messages with other devices. As described, UE 908 can notify TCP layer 906 of handover complete 910. Based at least in part on receiving the notification, TCP layer 906 can initialize suspend timer 912 to allow data forwarding to complete following handover. During the suspend timer 912, TCP layer 906 can provide one or more received TCP packets 914 to UE 908, which can be packets provided to UE 908 from data forwarding, but can pause TCP feedback transmission. After suspend timer 912 expires, TCP layer 906 can resume TCP feedback transmission, and thus congestion control, and can, for example, transmit a duplicated ACK 916 or other feedback to UE 908 to indicate out-of-sequence packet receiving.

In another example, system 902 comprises a TCP layer 918 and a UE 920. The TCP layer 918 can be part of the UE 920, for example, and can communicate messages with other devices. As described, UE 920 can notify TCP layer 918 of handover complete 922. Based at least in part on receiving the notification, TCP layer 918 can analyze received packets, such as TCP packet 924, to determine a sequence number associated therewith. For example, the sequence number can be in a header of the packet. TCP layer 918 can analyze a number of packets to determine a last packet received with sequence number SK<T+rx_min_wnd 926 for a period of idle time, where T is a configured threshold above the lower end index of the receive window, rx_min_wnd, following handover. Every time a packet is received with sequence number SK<T+rx_min_wnd, a timer can be initialized, such as idle time 928. Once idle time 928 expires without receiving another packet with sequence number SK<T+rx_min_wnd, TCP later 918 can resume transmitting TCP feedback, and thus resume congestion control, and can, in one example, transmit a duplicated ACK 930.

In yet another example, system 904 comprises a TCP layer 932 and a UE 934. The TCP layer 932 can be part of the UE 934, for example, and can communicate messages with other devices. As described, UE 934 can notify TCP layer 932 of handover complete 936. Based at least in part on receiving the notification, TCP layer 932 can analyze received packets, such as TCP packet 938, to determine whether the packet has a reserved bit initialized (e.g., equal to 1). Once TCP layer 932 encounters a packet with a reserved bit initialized 940, TCP layer 932 can resume TCP feedback transmission, and thus resume congestion control, and/or can transmit a duplicated ACK 942.

Referring to FIGS. 10-13, example methodologies relating to pausing TCP transmissions based at least in part on handover are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 10:
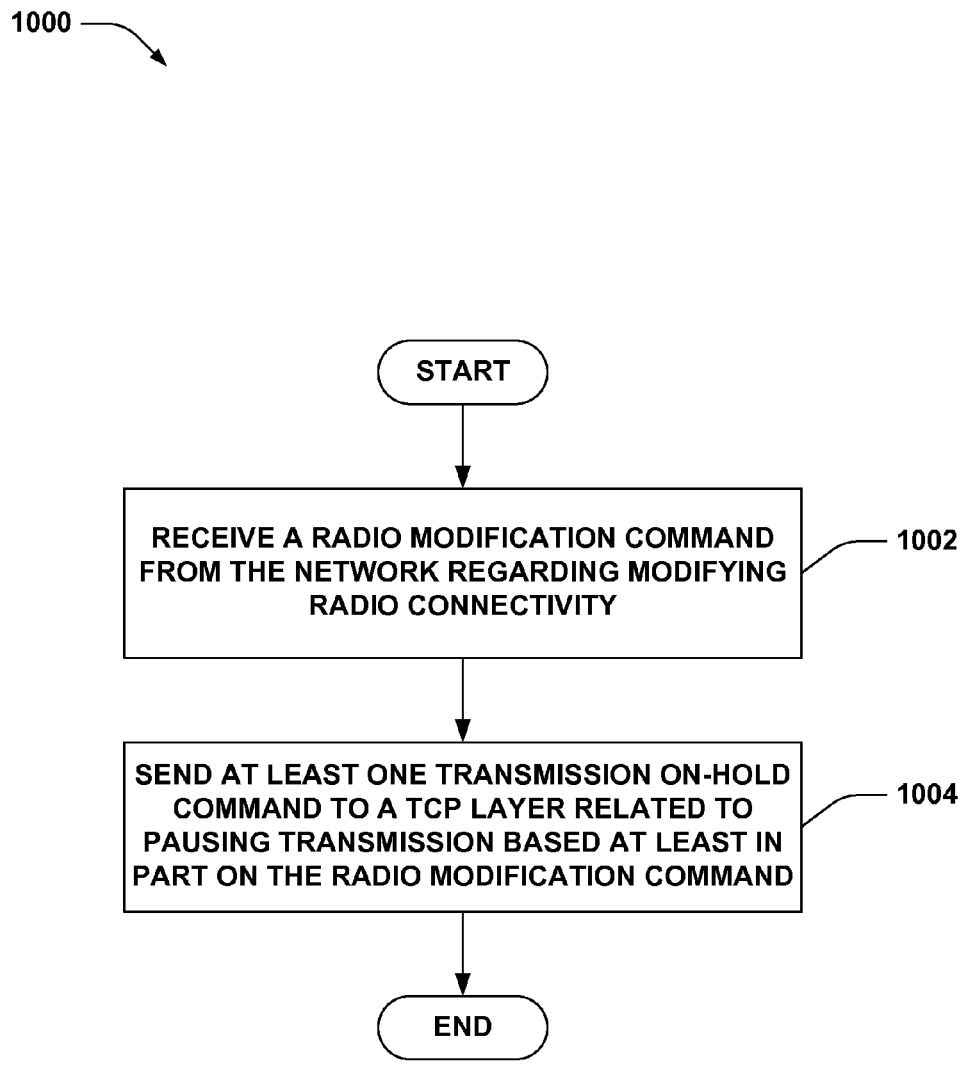
FIG. 10 illustrates an example methodology that pauses TCP transmission based at least in part on determining to modify radio connectivity.

Referring to FIG. 10, an example methodology 1000 is displayed that facilitates pausing transmissions at a TCP layer based at least in part on a handover. At 1002, a radio modification command can be received from the network regarding modifying radio connectivity. The radio modification command can, for example, be part of a handover procedure, such as a handover command, a connection release or reconfiguration request, and/or the like. At 1004, at least one transmission on-hold command can be sent to a TCP layer related to pausing transmission based at least in part on the radio modification command. For example, the transmission on-hold command can relate to preparing to pause TCP transmissions, immediately pausing TCP transmissions, and/or the like. Thus, TCP transmissions can be paused based at least in part on modifying radio connectivity.

Figure 11:
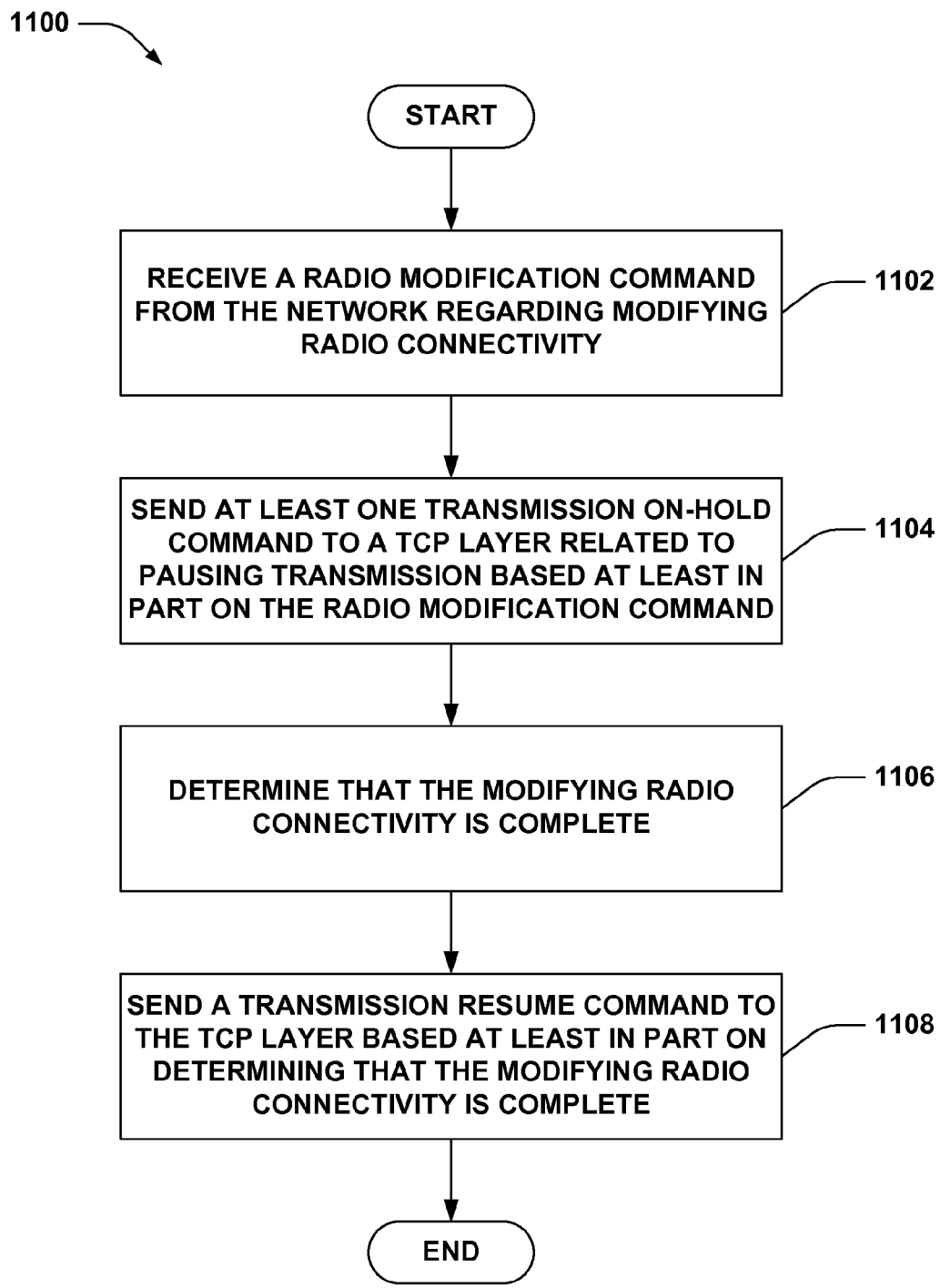
FIG. 11 illustrates an example methodology that pauses and resumes TCP transmission based at least in part on handover.

Turning to FIG. 11, an example methodology 1100 is displayed that facilitates pausing transmissions at a TCP layer based at least in part on a handover. At 1102, a radio modification command can be received from the network regarding modifying radio connectivity. The radio modification command can, for example, be part of a handover procedure, such as a handover command, a connection release or reconfiguration request, and/or the like. At 1104, at least one transmission on-hold command can be sent to a TCP layer related to pausing transmission based at least in part on the radio modification command. For example, the transmission on-hold command can relate to preparing to pause TCP transmissions, immediately pausing TCP transmissions, and/or the like. At 1106, it can be determined that the modifying radio connectivity is complete. For example, this can additionally be part of the handover procedure, such as transmitting a traffic channel complete message, receiving a VSNCP message, transmitting a handover complete message, establishing a radio bearer, transmitting an RRCConnectionReconfiguration-Complete message, and/or the like. At 1108, a transmission resume command can be sent to the TCP layer based at least in part on determining that the modifying radio connectivity is complete. Thus, TCP transmissions are paused during a portion of a handover procedure to prevent transmitting duplicated ACKs, experiencing retransmission timeout, and/or the like.

Figure 12:
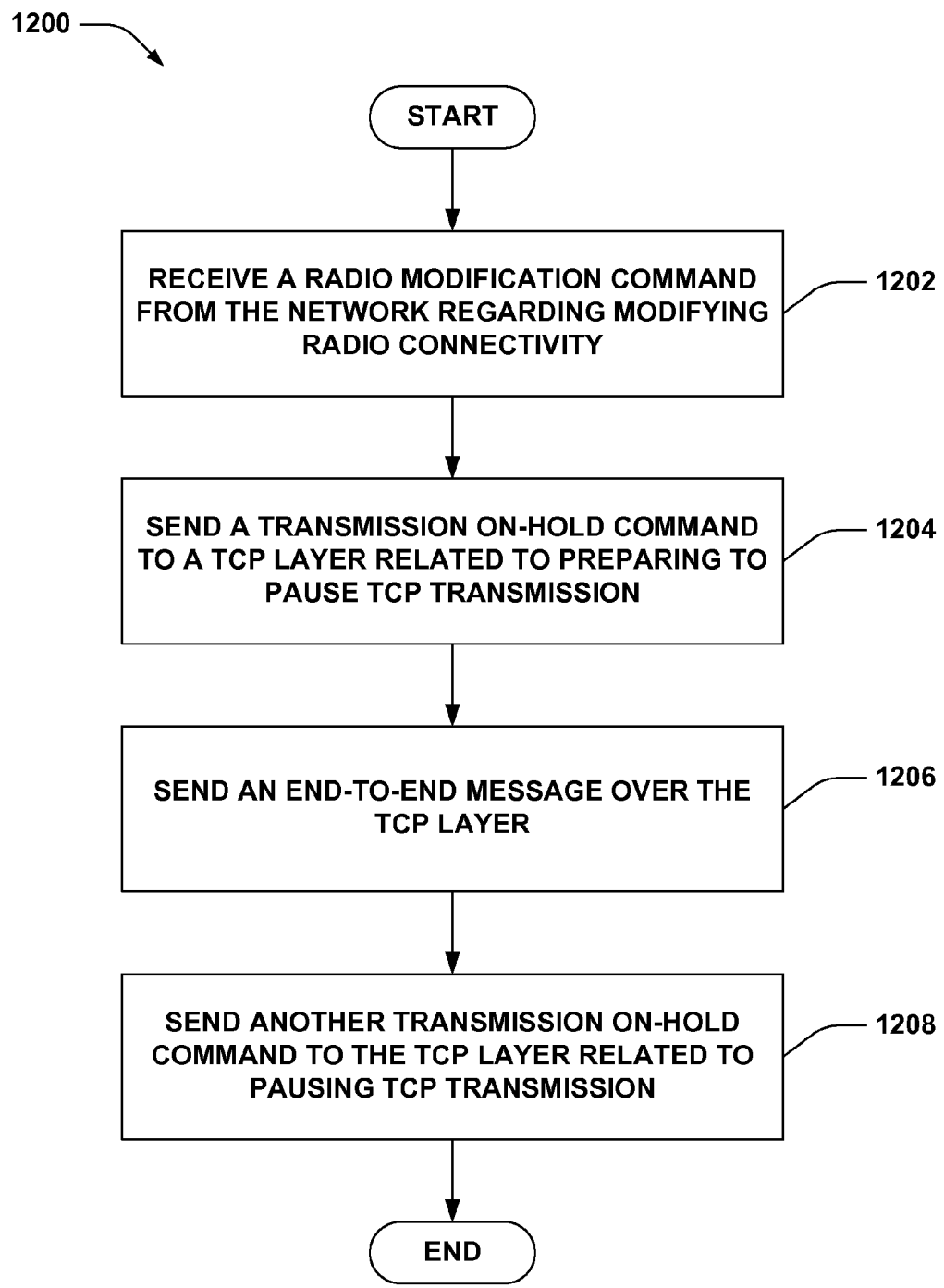
FIG. 12 illustrates an example methodology that sends multiple transmission on-hold commands to a TCP layer based at least in part on a handover.

Referring to FIG. 12, an example methodology 1200 that facilitates sending multiple transmission on-hold commands to a TCP layer is illustrated. At 1202, a radio modification command can be received from the network regarding modifying radio connectivity. The radio modification command can, for example, be part of a handover procedure, such as a handover command, a connection release or reconfiguration request, and/or the like. At 1204, a transmission on-hold command can be sent to a TCP layer related to preparing to pause TCP transmission. In this regard, at 1206, an end-to-end message can be sent over the TCP layer. This can be in preparation for pausing TCP transmission. At 1208, another transmission on-hold command can be sent to the TCP layer related to pausing the TCP transmission. The TCP layer can accordingly pause TCP transmissions at this time.

Figure 13:
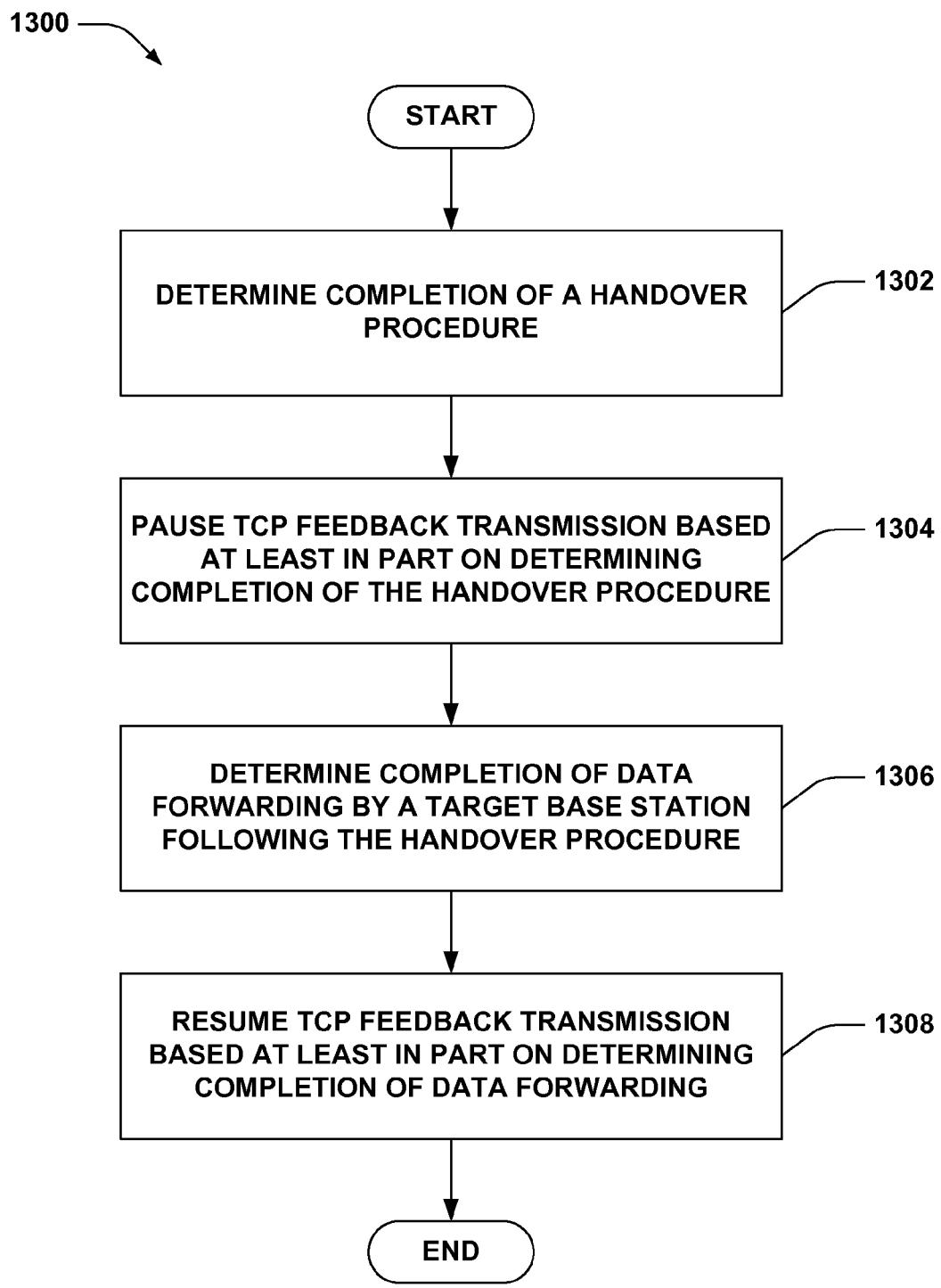
FIG. 13 illustrates an example methodology that controls TCP transmission following handover to allow for communication of data forwarding data.

Turning to FIG. 13, an example methodology 1300 that facilitates controlling TCP transmission following a handover is illustrated. At 1302, completion of a handover procedure can be determined. As described, this can include receiving an indication of such from one or more layers of a device, can be based on transmitting or receiving one or more messages, and/or the like. At 1304, TCP feedback transmission can be paused based at least in part on determining completion of the handover procedure. For example, this can allow data forwarding data to be received from one or more base stations regardless of sequence without allowing the TCP layer to transmit duplicated ACKs, as described. At 1306, completion of data forwarding by a target base station can be determined following the handover procedure. As described, completion of data forwarding can be determined based at least in part on a timer, evaluating a sequence number in one or more packets, determining whether a reserved bit is initialized in the one or more packets, and/or the like. At 1308, TCP feedback transmission can be resumed based at least in part on determining completion of data forwarding.

It will be appreciated that, in accordance with one or more aspects described herein, inferences can be made regarding determining when to pause and/or resume TCP transmissions, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 14:
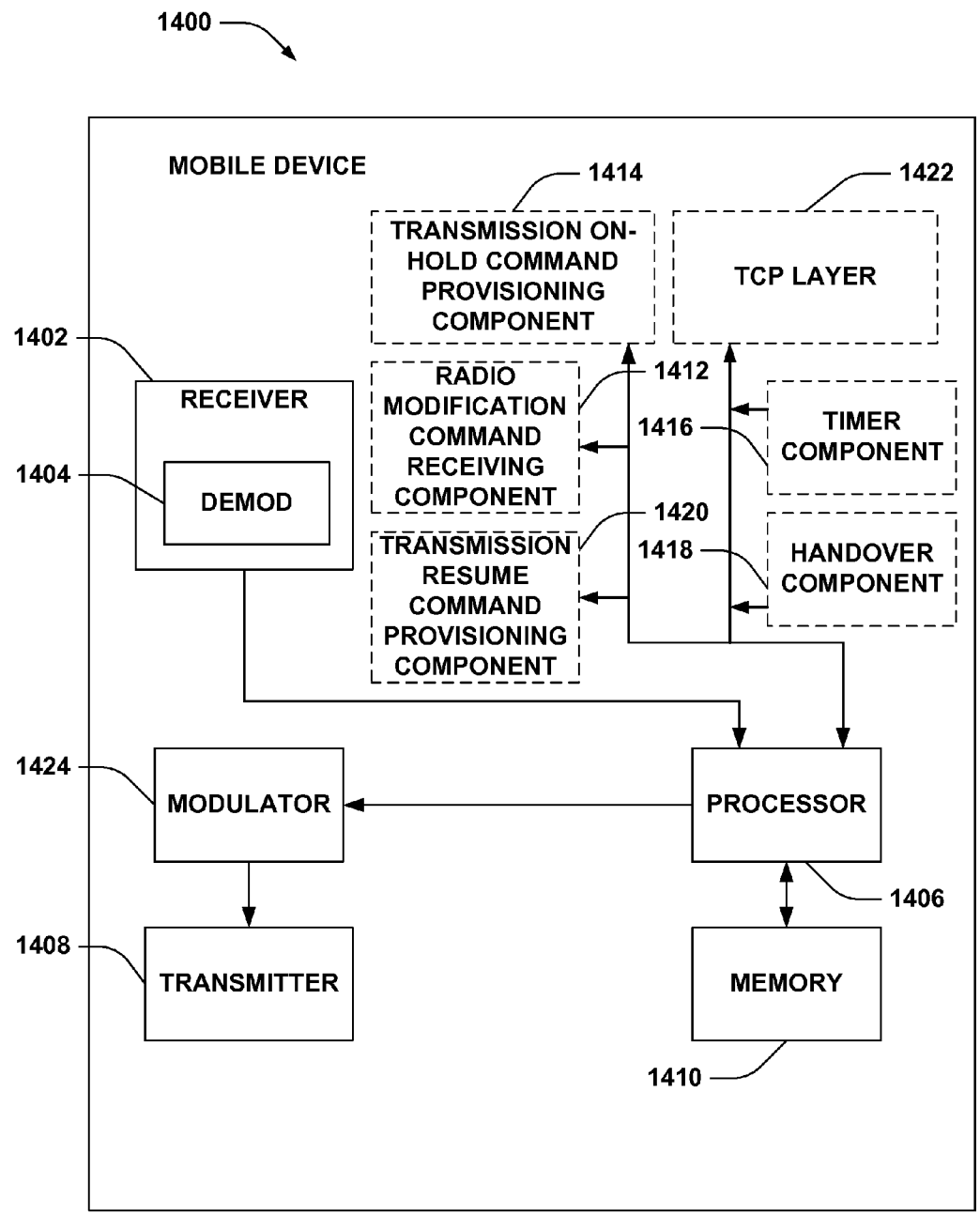
FIG. 14 illustrates an example mobile device that controls TCP transmission based at least in part on a handover.

FIG. 14 is an illustration of a mobile device 1400 that facilitates pausing and resuming TCP layer transmissions during and/or following handover. Mobile device 1400 comprises a receiver 1402 that receives a signal from, for instance, a receive antenna (not shown), performs typical actions on (e.g., filters, amplifies, downconverts, etc.) the received signal, and digitizes the conditioned signal to obtain samples. Receiver 1402 can comprise a demodulator 1404 that can demodulate received symbols and provide them to a processor 1406 for channel estimation. Processor 1406 can be a processor dedicated to analyzing information received by receiver 1402 and/or generating information for transmission by a transmitter 1408, a processor that controls one or more components of mobile device 1400, and/or a processor that both analyzes information received by receiver 1402, generates information for transmission by transmitter 1408, and controls one or more components of mobile device 1400.

Mobile device 1400 can additionally comprise memory 1410 that is operatively coupled to processor 1406 and that can store data to be transmitted, received data, information related to available channels, data associated with analyzed signal and/or interference strength, information related to an assigned channel, power, rate, or the like, and any other suitable information for estimating a channel and communicating via the channel. Memory 1410 can additionally store protocols and/or algorithms associated with estimating and/or utilizing a channel (e.g., performance based, capacity based, etc.).

It will be appreciated that the data store (e.g., memory 1410) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES- DRAM), Synchlink DRAM (SLDRAM), and direct Rambus RAM (DRRAM). The memory 1410 of the subject systems and methods is intended to comprise, without being limited to, these and any other suitable types of memory.

Processor 1406 can further be optionally operatively coupled to a radio modification command receiving component 1412, which can be similar to radio modification command receiving component 208, a transmission on-hold command provisioning component 1414, which can be similar to transmission on-hold command provisioning component 210, and a timer component 1416, which can be similar to timer component 212. In addition, processor 1406 can be optionally coupled to a handover component 1418, which can be similar to handover component 214 and/or handover component 308, a transmission resume command provisioning component 1420, which can be similar to transmission resume command provisioning component 216, and a TCP layer 1422, which can be similar to TCP layer 218 and/or TCP layer 310 (e.g., and/or can comprise components of TCP layer 310). Mobile device 1400 still further comprises a modulator 1424 that modulate signals for transmission by transmitter 1408 to, for instance, a base station, another mobile device, etc. Although depicted as being separate from the processor 1406, it is to be appreciated that the radio modification command receiving component 1412, transmission on-hold command provisioning component 1414, timer component 1416, handover component 1418, transmission resume command provisioning component 1420, TCP layer 1422, demodulator 1404, and/or modulator 1424 can be part of the processor 1406 or multiple processors (not shown).

Figure 15:
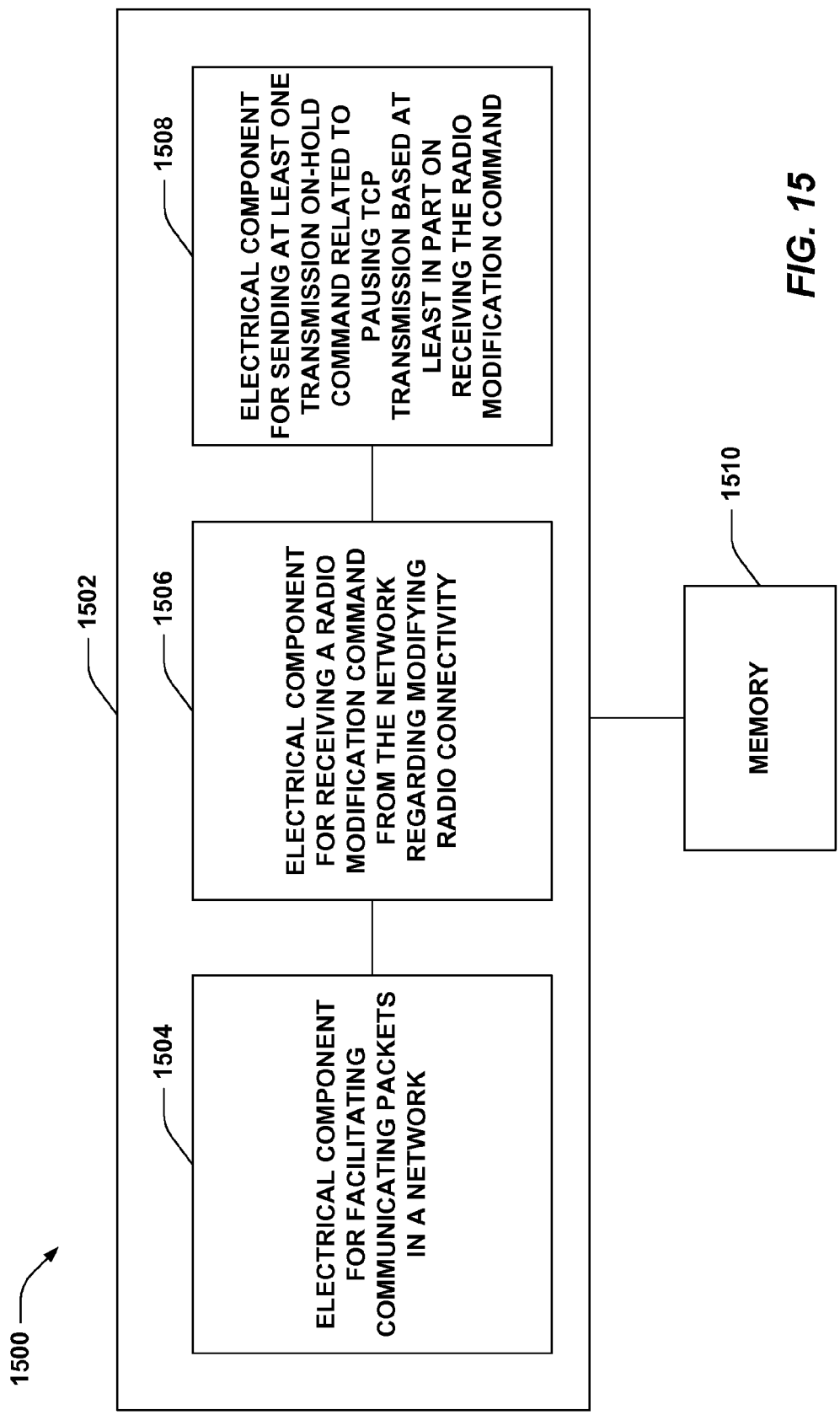
FIG. 15 illustrates an example system for pausing TCP transmission based at least in part on handover.

With reference to FIG. 15, illustrated is a system 1500 that pauses TCP transmission based at least in part on a handover. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for facilitating communicating packets in a network 1504. For example, electrical component 1504 can be and/or can utilize a TCP layer for such communications. Moreover, logical grouping 1502 can include an electrical component for receiving a radio modification command from the network regarding modifying radio connectivity 1506.

For example, the radio modification command can be a message received as part of a handover, such as a handover message, a connection release or reconfiguration message, and/or the like. Further, logical grouping 1502 can comprise an electrical component for sending at least one transmission on-hold command related to pausing TCP transmission based at least in part on receiving the radio modification command 1508. The transmission on-hold command can relate to preparing to pause TCP transmissions, immediately pausing TCP transmissions, etc. For example, in an aspect, electrical component 1504 can include TCP layer 218 and/or TCP layer 310 (e.g., and/or components comprised within TCP layer 310), and electrical component 1506 can include radio modification command receiving component 208. In addition, for example, electrical component 1508, in an aspect, can include transmission on-hold command provisioning component 210, as described above. Additionally, system 1500 can include a memory 1510 that retains instructions for executing functions associated with the electrical components 1504, 1506, and 1508. While shown as being external to memory 1510, it is to be understood that one or more of the electrical components 1504, 1506, and 1508 can exist within memory 1510.

In one example, electrical components 1504, 1506, and 1508 can comprise at least one processor, or each electrical component 1504, 1506, and 1508 can be a corresponding module of at least one processor. Moreover, in an additional or alternative example, electrical components 1504, 1506, and 1508 can be a computer program product comprising a computer readable medium, where each electrical component 1504, 1506, and 1508 can be corresponding code.

Figure 16:
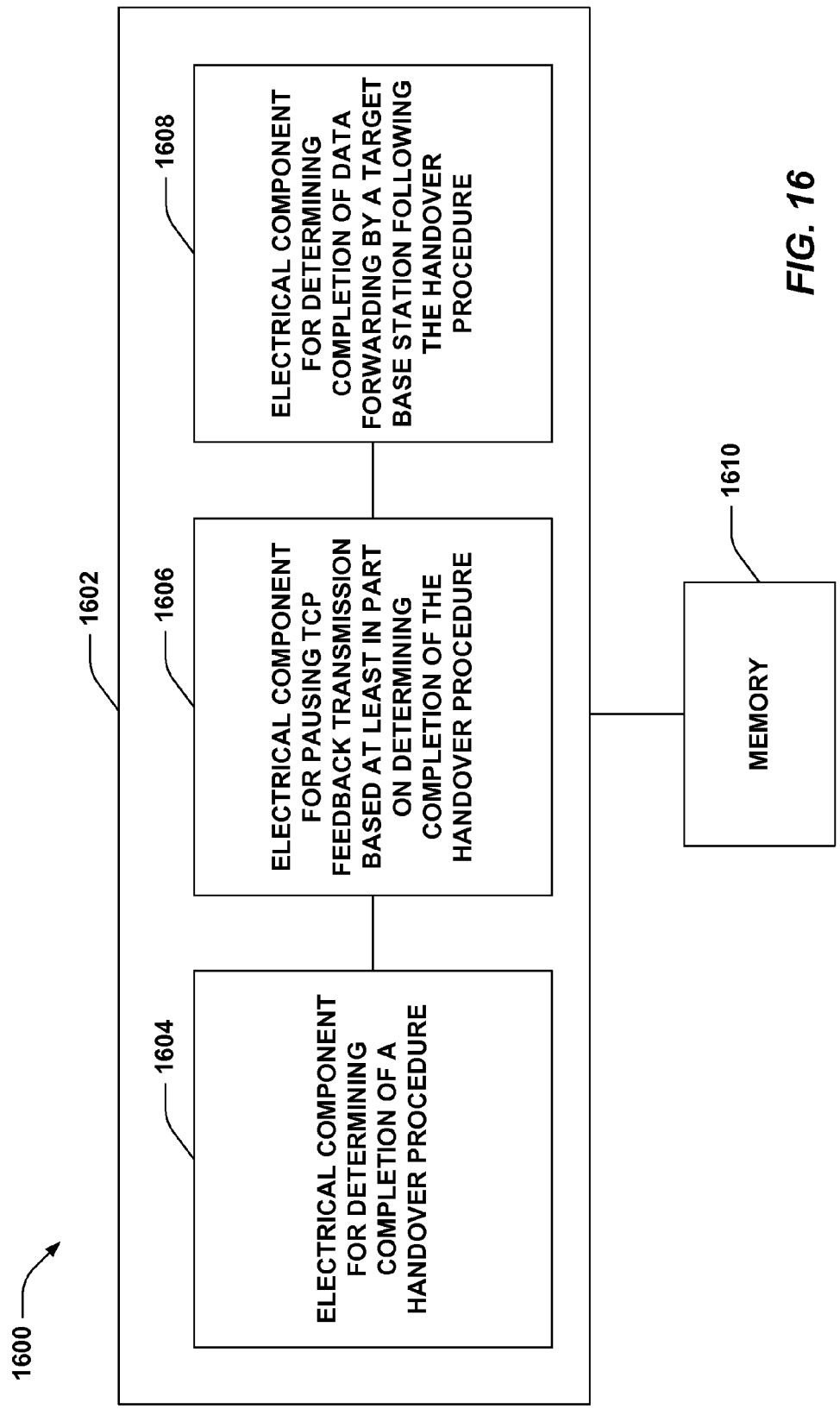
FIG. 16 illustrates an example system for controlling TCP transmission following handover.

With reference to FIG. 16, illustrated is a system 1600 that controls TCP feedback transmission during receiving data forwarding data. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for determining completion of a handover procedure 1604. For example, this can include receiving an indication of the completion from another layer, receiving or transmitting one or more messages related to completion, and/or the like. Moreover, logical grouping 1602 can include an electrical component for pausing TCP transmission based at least in part on determining completion of the handover procedure 1606.

For example, data forwarding data can be received after handover and can be received out-of-sequence, as described. Thus, it may not be desirable to allow duplicate ACK transmission until data forwarding data has been received. Further, logical grouping 1602 can comprise an electrical component for determining completion of data forwarding by a target base station following the handover procedures 1608. This can include, for example, determining expiration of a timer, analyzing packet sequence numbers, determining an initialized reserved bit, and/or the like, as described. Moreover, based at least in part on electrical component 1608 determining completion of data forwarding, electrical component 1606 can resume TCP feedback transmission, as described. For example, in an aspect, electrical component 1604 can include handover component 308, and electrical component 1606 can include TCP layer 310. In addition, for example, electrical component 1608, in an aspect, can include timer component 314, sequence number analyzing component 316, and/or reserved bit determining component 318. Additionally, system 1600 can include a memory 1610 that retains instructions for executing functions associated with the electrical components 1604, 1606, and 1608. While shown as being external to memory 1610, it is to be understood that one or more of the electrical components 1604, 1606, and 1608 can exist within memory 1610.

In one example, electrical components 1604, 1606, and 1608 can comprise at least one processor, or each electrical component 1604, 1606, and 1608 can be a corresponding module of at least one processor. Moreover, in an additional or alternative example, electrical components 1604, 1606, and 1608 can be a computer program product comprising a computer readable medium, where each electrical component 1604, 1606, and 1608 can be corresponding code.

Figure 17:
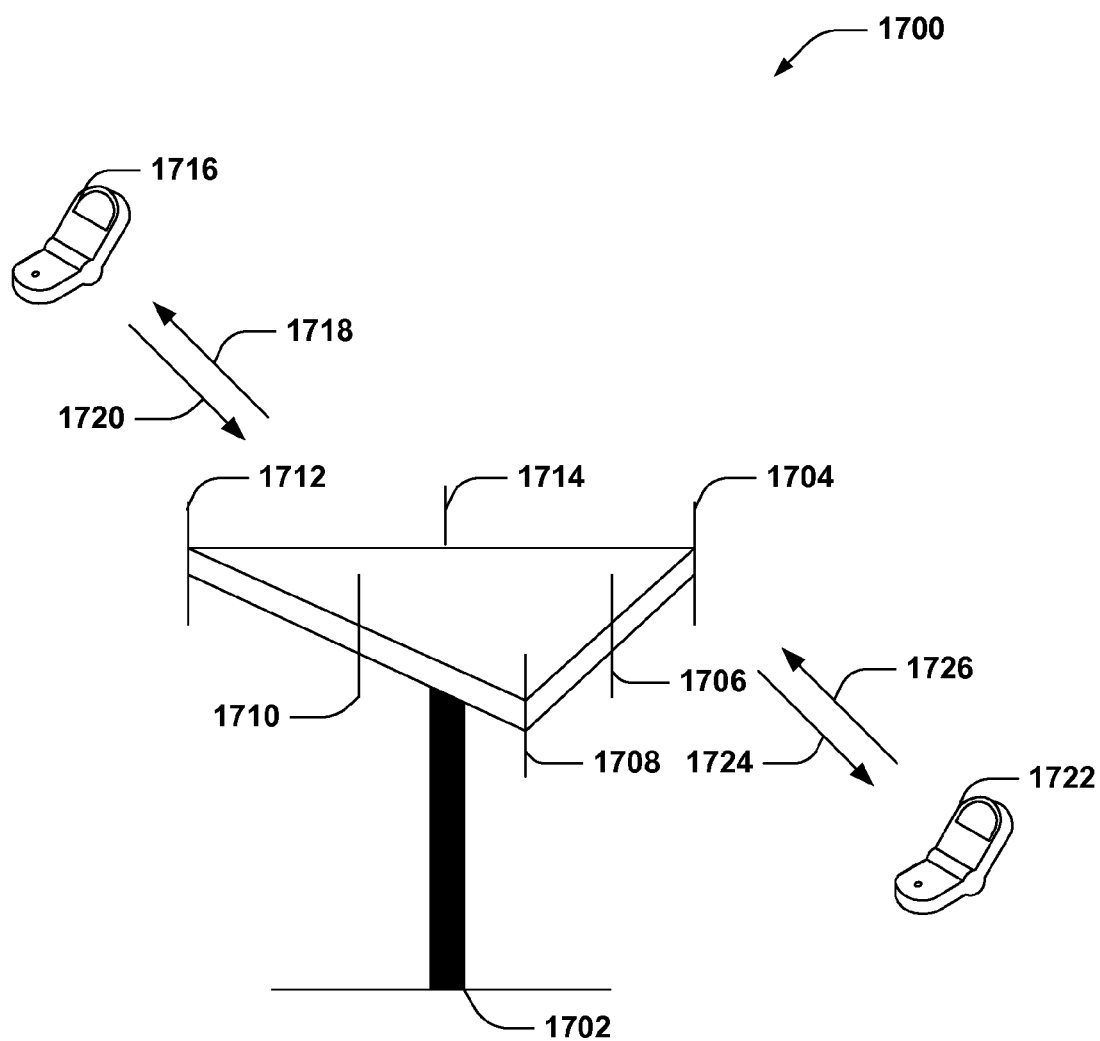
FIG. 17 illustrates an example wireless communication system in accordance with various aspects set forth herein.

Referring now to FIG. 17, a wireless communication system 1700 is illustrated in accordance with various embodiments presented herein. System 1700 comprises a base station 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1702 can communicate with one or more mobile devices such as mobile device 1716 and mobile device 1722; however, it is to be appreciated that base station 1702 can communicate with substantially any number of mobile devices similar to mobile devices 1716 and 1722. Mobile devices 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, mobile device 1716 is in communication with antennas 1712 and 1714, where antennas 1712 and 1714 transmit information to mobile device 1716 over a forward link 1718 and receive information from mobile device 1716 over a reverse link 1720. Moreover, mobile device 1722 is in communication with antennas 1704 and 1706, where antennas 1704 and 1706 transmit information to mobile device 1722 over a forward link 1724 and receive information from mobile device 1722 over a reverse link 1726. In a frequency division duplex (FDD) system, forward link 1718 can utilize a different frequency band than that used by reverse link 1720, and forward link 1724 can employ a different frequency band than that employed by reverse link 1726, for example. Further, in a time division duplex (TDD) system, forward link 1718 and reverse link 1720 can utilize a common frequency band and forward link 1724 and reverse link 1726 can utilize a common frequency band.

Each group of antennas and/or the area in which they are designated to communicate can be referred to as a sector of base station 1702. For example, antenna groups can be designed to communicate to mobile devices in a sector of the areas covered by base station 1702. In communication over forward links 1718 and 1724, the transmitting antennas of base station 1702 can utilize beamforming to improve signal-to-noise ratio of forward links 1718 and 1724 for mobile devices 1716 and 1722. Also, while base station 1702 utilizes beamforming to transmit to mobile devices 1716 and 1722 scattered randomly through an associated coverage, mobile devices in neighboring cells can be subject to less interference as compared to a base station transmitting through a single antenna to all its mobile devices. Moreover, mobile devices 1716 and 1722 can communicate directly with one another using a peer-to-peer or ad hoc technology as depicted. According to an example, system 1700 can be a multiple-input multiple-output (MIMO) communication system.

Figure 18:
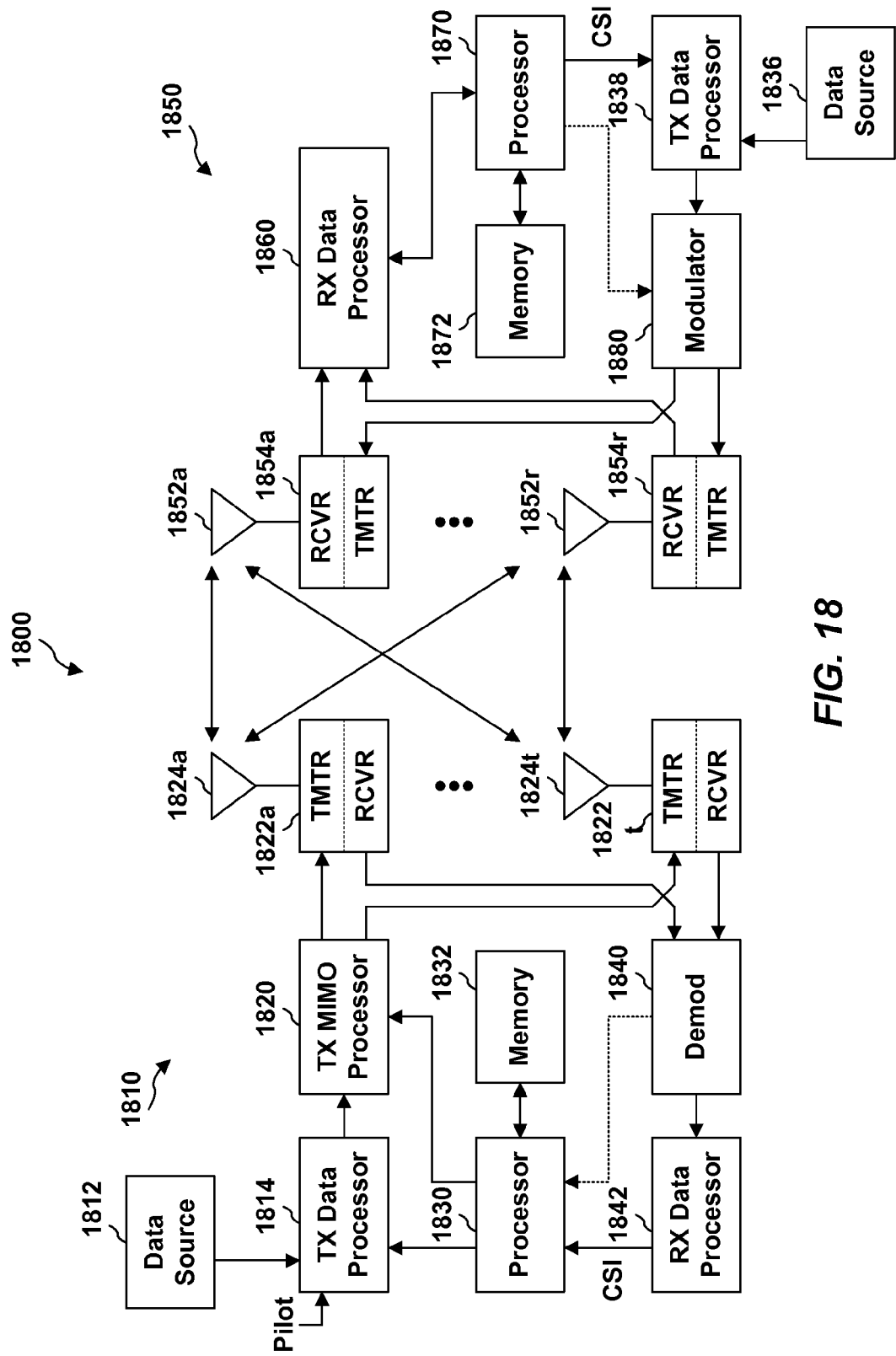
FIG. 18 illustrates an example wireless network environment that can be employed in conjunction with the various systems and methods described herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-9 and 15-17), mobile devices, (FIG. 14), and/or methods (FIGS. 10-13) described herein to facilitate wireless communication there between. For example, components or functions of the systems and/or methods described herein can be part of a memory 1832 and/or 1872 or processors 1830 and/or 1870 described below, and/or can be executed by processors 1830 and/or 1870 to perform the disclosed functions.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides NT modulation symbol streams to NT transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1822a through 1822t are transmitted from NT antennas 1824a through 1824t, respectively.

At mobile device 1850, the transmitted modulated signals are received by NR antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the NR received symbol streams from NR receivers 1854 based on a particular receiver processing technique to provide NT "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of pausing transmission control protocol (TCP) transmission based at least in part on a handover, comprising:
  receiving a radio modification command from a network regarding modifying radio connectivity;
  sending at least one transmission on-hold command to a TCP layer to prepare to pause TCP transmission based at least in part on receiving the radio modification command;
  based at least in part on the at least one transmission on-hold command, performing at least one of:
    sending an end-to-end message over the TCP layer, or initializing a timer; and
  sending a subsequent transmission on-hold command subsequent to the at least one transmission on-hold command to the TCP layer to immediately pause TCP transmission, wherein the subsequent transmission on-hold command is sent to the TCP layer after sending the end-to-end message or upon an expiration of the timer.

2. The method of claim 1, further comprising pausing TCP transmission based at least in part on the at least one transmission on-hold command or the subsequent transmission on-hold command.

3. The method of claim 2, further comprising:
  pausing a TCP retransmission timer based at least in part on the at least one transmission on-hold command or the subsequent transmission on-hold command; and
  resuming the TCP retransmission timer based at least in part on a transmission resume command.

4. The method of claim 1, further comprising:
  determining that the modifying radio connectivity is complete; and
  sending a transmission resume command to the TCP layer related to resuming TCP transmission based at least in part on the determining that the modifying radio connectivity is complete.

5. The method of claim 1, wherein the radio modification command relates to performing handover to another network.

6. The method of claim 5, wherein the radio modification command relates to releasing resources to perform the handover.

7. An apparatus for pausing transmission control protocol (TCP) transmission based at least in part on a handover, comprising:
  at least one processor configured to:

obtain a radio modification command from a network regarding modifying radio connectivity;
send at least one transmission on-hold command to a TCP layer to prepare to pause TCP transmission based at least in part on the radio modification command;
based at least in part on the at least one transmission on-hold command, perform at least one of:
sending an end-to-end message over the TCP layer, or initializing a timer; and
send a subsequent transmission on-hold command subsequent to the at least one transmission on-hold command to the TCP layer to immediately pause TCP transmission, wherein the subsequent transmission on-hold command is sent to the TCP layer after sending the end-to-end message or upon an expiration of the timer; and
a memory coupled to the at least one processor.

8. The apparatus of claim 7, wherein the at least one processor is further configured to pause TCP transmission based at least in part on the at least one transmission on-hold command or the subsequent transmission on-hold command.

9. The apparatus of claim 8, wherein the at least one processor is further configured to:
pause a TCP retransmission timer based at least in part on the at least one transmission on-hold command or the subsequent transmission on-hold command; and
resume the TCP retransmission timer based at least in part on a transmission resume command.

10. The apparatus of claim 7, wherein the at least one transmission on-hold command indicates to prepare for pausing transmission or to immediately pause transmission.

11. The apparatus of claim 7, wherein the at least one processor is further configured to send a transmission resume command to the TCP layer related to resuming TCP transmission based at least in part on determining that the modifying radio connectivity is complete.

12. The apparatus of claim 7, wherein the radio modification command relates to performing handover to another network.

13. The apparatus of claim 12, wherein the radio modification command relates to releasing resources to perform the handover.

14. An apparatus for pausing transmission control protocol (TCP) transmission based at least in part on a handover, comprising:
means for facilitating communicating packets in a network;
means for receiving a radio modification command from the network regarding modifying radio connectivity;
means for sending at least one transmission on-hold command to the means for facilitating communicating to prepare to pause TCP transmission based at least in part on receiving the radio modification command;
means for performing, based at least in part on the at least one transmission on-hold command, at least one of:
sending an end-to-end message over the TCP layer, or initializing a timer; and
means for sending a subsequent transmission on-hold command subsequent to the at least one transmission on-hold command-to the means for facilitating communicating to immediately pause TCP transmission, wherein the subsequent transmission on-hold command is sent to the TCP layer after sending the end-to-end message or upon an expiration of the timer.

15. The apparatus of claim 14, wherein the means for facilitating communicating pauses TCP transmission based at least in part on the at least one transmission on-hold command or the subsequent transmission on-hold command.

16. The apparatus of claim 15, wherein the means for facilitating communicating pauses a TCP retransmission timer based at least in part on the at least one transmission on-hold command or the subsequent transmission on-hold command, and resumes the TCP retransmission timer based at least in part on a transmission resume command.

17. The apparatus of claim 14, further comprising:
means for determining that the modifying radio connectivity is complete; and
means for transmitting a transmission resume command to the means for facilitating communicating based at least in part on the means for determining that the modifying radio connectivity is complete.

18. The apparatus of claim 14, wherein the radio modification command relates to performing handover to another network.

19. The apparatus of claim 18, wherein the radio modification command relates to releasing resources to perform the handover.

20. A computer program product for pausing transmission control protocol (TCP) transmission based at least in part on a handover, comprising:
a non-transitory computer-readable medium, comprising:
code for causing at least one computer to obtain a radio modification command from a network regarding modifying radio connectivity;
code for causing the at least one computer to send at least one transmission on-hold command to a TCP layer to prepare to pause TCP transmission based at least in part on the radio modification command;
code for causing the at least one computer to perform, based at least in part on the at least one transmission on-hold command, at least one of:
sending an end-to-end message over the TCP layer, or initializing a timer; and
code for causing the at least one computer to send a subsequent transmission on-hold command subsequent to the at least one transmission on-hold command-to the TCP layer to immediately pause TCP transmission, wherein the subsequent transmission on-hold command is sent to the TCP layer after sending the end-to-end message or upon an expiration of the timer.

21. The computer program product of claim 20, wherein the computer-readable medium further comprises code for causing the at least one computer to pause TCP transmission based at least in part on the at least one transmission on-hold command or the subsequent transmission on-hold command.

22. The computer program product of claim 21, wherein the computer-readable medium further comprises code for causing the at least one computer to suspend a TCP retransmission timer based at least in part on the at least one transmission on-hold command or the subsequent transmission on-hold command, and resume the TCP retransmission timer based at least in part on a transmission resume command.

23. The computer program product of claim 20, wherein the computer-readable medium further comprises code for causing the at least one computer to send a transmission resume command to the TCP layer related to resuming TCP transmission based at least in part on determining that the modifying radio connectivity is complete.

24. The computer program product of claim 20, wherein the radio modification command relates to performing handover to another network.

25. The computer program product of claim 24, wherein the radio modification command relates to releasing resources to perform the handover.

26. An apparatus for pausing transmission control protocol (TCP) transmission based at least in part on a handover, comprising:
- a TCP layer for facilitating communicating packets in a network;
- a radio modification command receiving component for obtaining a radio modification command from the network regarding modifying radio connectivity; and
- a transmission on-hold command provisioning component for:
  - sending at least one transmission on-hold command to the TCP layer to prepare to pause TCP transmission based at least in part on receiving the radio modification command;
  - based at least in part on the at least one transmission on-hold command, performing at least one of:
    - sending an end-to-end message over the TCP layer, or
    - initializing a timer; and
  - sending a subsequent transmission on-hold command subsequent to the at least one transmission on-hold command to the TCP layer to immediately pause TCP transmission, wherein the subsequent transmission on-hold command is sent to the TCP layer after sending the end-to-end message or upon an expiration of the timer.

27. The apparatus of claim 26, wherein the TCP layer pauses TCP transmission based at least in part on the at least one transmission on-hold command or the subsequent transmission on-hold command.

28. The apparatus of claim 27, wherein the TCP layer pauses a TCP retransmission timer based at least in part on the at least one transmission on-hold command or the subsequent transmission on-hold command, and resumes the TCP retransmission timer based at least in part on a transmission resume command.

29. The apparatus of claim 26, further comprising:
- a handover component for determining that the modifying radio connectivity is complete; and
- a transmission resume command provisioning component for sending a transmission resume command to the TCP layer based at least in part on the handover component determining that the modifying radio connectivity is complete.

30. The apparatus of claim 26, wherein the radio modification command relates to performing handover to another network.

31. The apparatus of claim 30, wherein the radio modification command relates to releasing resources to perform the handover.

* * * * *